United States Patent
Rao et al.

(10) Patent No.: US 9,584,959 B2
(45) Date of Patent: Feb. 28, 2017

(54) SYSTEMS, METHODS, AND COMPUTER READABLE MEDIA FOR LOCATION-SENSITIVE CALLED-PARTY NUMBER TRANSLATION IN A TELECOMMUNICATIONS NETWORK

(75) Inventors: Raghavendra Gopala Rao, Cary, NC (US); Devesh Agarwal, Raleigh, NC (US); Adam B. Roach, Dallas, TX (US); Peter Joseph Marsico, Chapel Hill, NC (US)

(73) Assignee: Tekelec Global, Inc., Morrisville, NC (US)

( * ) Notice: Subject to any disclaimer, the term of this patent is extended or adjusted under 35 U.S.C. 154(b) by 960 days.

(21) Appl. No.: 12/625,017

(22) Filed: Nov. 24, 2009

(65) Prior Publication Data

US 2010/0157986 A1 Jun. 24, 2010

Related U.S. Application Data

(60) Provisional application No. 61/117,538, filed on Nov. 24, 2008.

(51) Int. Cl.
*H04L 12/66* (2006.01)
*H04W 4/02* (2009.01)
(Continued)

(52) U.S. Cl.
CPC ............ *H04W 4/02* (2013.01); *H04L 29/1216* (2013.01); *H04L 29/12896* (2013.01);
(Continued)

(58) Field of Classification Search
CPC ................ H04Q 3/0025; H04Q 3/0029; H04Q 2213/13141; H04Q 2213/13176; H04Q 2213/13345; H04Q 3/0045; H04Q 3/005; H04Q 3/66; H04Q 2213/13166; H04Q 2213/13389;H04Q 3/0062; H04Q 3/72; H04Q 2213/13091; H04Q 2213/13097; H04L 65/104; H04L 45/00; H04L 12/66; H04L 29/1216; H04L 61/157; H04L 65/1006; H04L 65/1096; H04L 12/5895; H04L 12/6418; H04L 29/06027; H04L 29/12896; H04L 45/02; H04L 45/021; H04L 45/12; H04L 45/122; H04L 45/304; H04M 3/42306; H04M 15/00; H04M 3/42; H04M 3/436; H04M 7/006; H04M 15/08; H04M 15/55; H04M 15/8038; H04M 17/00; H04M 2207/12; H04M 2215/2046; H04M 2215/2053; H04M 2215/62; H04M 2215/7442; H04M 3/12; H04M 3/2281
(Continued)

(56) References Cited

U.S. PATENT DOCUMENTS 3,917,915 A 11/1975 Karras
4,162,377 A 7/1979 Mearns
(Continued)

FOREIGN PATENT DOCUMENTS

CN 1968267 A 5/2007
CN ZL 200680051295.9 3/2013
(Continued)

OTHER PUBLICATIONS

Young-Fu Chang, "BICC Extension of SIP in Inter-Network Configuration," Lucent Technologies draft-chang-sipping-bicc-network-00.txt (Sep. 2001).
(Continued)

*Primary Examiner* — Melanie Jagannathan
*Assistant Examiner* — Najeebuddin Ansari
(74) *Attorney, Agent, or Firm* — Jenkins, Wilson, Taylor & Hunt, P.A.

(57) ABSTRACT

Systems, methods, and computer readable media for location-sensitive identifier translation in a telecommunications network are disclosed. According to one aspect, the subject matter described herein includes a method for providing location-sensitive called-party identifier translation in a telecommunications network. The method includes, at a signaling node that includes at least one processor: receiving a first signaling message that includes a called party identifier; determining proximity information associated with the calling party; performing a location-sensitive called party identifier translation based on the proximity information associated with the calling party; and sending the first signaling message or a second signaling message, the sent message including the translated called party identifier.

15 Claims, 13 Drawing Sheets

(51) Int. Cl.
  H04L 29/12 (2006.01)
  H04M 3/42 (2006.01)
  H04Q 3/00 (2006.01)
  H04Q 3/72 (2006.01)
  H04Q 3/76 (2006.01)
  H04L 29/08 (2006.01)
  H04L 29/06 (2006.01)

(52) U.S. Cl.
  CPC .......... *H04L 61/106* (2013.01); *H04L 61/157* (2013.01); *H04L 61/605* (2013.01); *H04L 61/609* (2013.01); *H04L 67/18* (2013.01); *H04M 3/42306* (2013.01); *H04M 3/42357* (2013.01); *H04Q 3/0025* (2013.01); *H04Q 3/72* (2013.01); *H04Q 3/76* (2013.01); *H04L 65/1096* (2013.01); *H04M 2207/12* (2013.01)

(58) Field of Classification Search
  USPC .................................................. 370/352–356
  See application file for complete search history.

(56) References Cited

U.S. PATENT DOCUMENTS

| | | |
|---|---|---|
| 4,191,860 A | 3/1980 | Weber |
| 4,310,727 A | 1/1982 | Lawser |
| 4,313,035 A | 1/1982 | Jordan et al. |
| 4,385,206 A | 5/1983 | Bradshaw et al. |
| 4,754,479 A | 6/1988 | Bicknell et al. |
| 4,756,020 A | 7/1988 | Fodale |
| 4,757,267 A | 7/1988 | Riskin |
| 4,769,834 A | 9/1988 | Billinger et al. |
| 4,788,718 A | 11/1988 | McNabb et al. |
| 4,819,156 A | 4/1989 | DeLorme et al. |
| 4,897,835 A | 1/1990 | Gaskill et al. |
| 4,897,870 A | 1/1990 | Golden |
| 4,959,849 A | 9/1990 | Bhusri |
| 4,972,461 A | 11/1990 | Brown et al. |
| 5,008,929 A | 4/1991 | Olsen et al. |
| 5,089,954 A | 2/1992 | Rago |
| 5,150,357 A | 9/1992 | Hopner et al. |
| 5,237,604 A | 8/1993 | Ryan |
| 5,247,571 A | 9/1993 | Kay et al. |
| 5,251,248 A | 10/1993 | Tokunaga et al. |
| 5,291,481 A | 3/1994 | Doshi et al. |
| 5,315,580 A | 5/1994 | Phaal |
| 5,341,680 A | 8/1994 | Mains, Jr. |
| 5,400,390 A | 3/1995 | Salin |
| 5,402,474 A | 3/1995 | Miller et al. |
| 5,422,941 A | 6/1995 | Hasenauer et al. |
| 5,423,068 A | 6/1995 | Hecker |
| 5,426,688 A | 6/1995 | Anand |
| 5,430,709 A | 7/1995 | Galloway |
| 5,430,719 A | 7/1995 | Weisser, Jr. |
| 5,438,570 A | 8/1995 | Karras et al. |
| 5,442,683 A | 8/1995 | Hoogeveen |
| 5,455,855 A | 10/1995 | Hokari |
| 5,457,692 A | 10/1995 | Ishinabe et al. |
| 5,457,729 A | 10/1995 | Hamann et al. |
| 5,457,736 A | 10/1995 | Cain et al. |
| 5,473,596 A | 12/1995 | Garafola et al. |
| 5,475,732 A | 12/1995 | Pester, III |
| 5,481,603 A | 1/1996 | Gutierrez et al. |
| 5,502,726 A | 3/1996 | Fischer |
| 5,504,804 A | 4/1996 | Widmark et al. |
| 5,506,893 A | 4/1996 | Buscher et al. |
| 5,521,902 A | 5/1996 | Ferguson |
| 5,526,400 A | 6/1996 | Nguyen |
| 5,533,107 A | 7/1996 | Irwin et al. |
| 5,539,804 A | 7/1996 | Hong et al. |
| 5,546,398 A | 8/1996 | Tucker et al. |
| 5,550,914 A | 8/1996 | Clarke et al. |
| 5,572,579 A | 11/1996 | Orriss et al. |
| 5,579,371 A | 11/1996 | Aridas et al. |
| 5,579,372 A | 11/1996 | Åström |
| 5,583,926 A | 12/1996 | Venier et al. |
| 5,586,177 A | 12/1996 | Farris et al. |
| 5,590,398 A | 12/1996 | Matthews |
| 5,592,530 A | 1/1997 | Brockman et al. |
| 5,594,942 A | 1/1997 | Antic et al. |
| 5,598,464 A | 1/1997 | Hess et al. |
| 5,602,909 A | 2/1997 | Carkner et al. |
| 5,606,600 A | 2/1997 | Elliott |
| 5,610,969 A | 3/1997 | McHenry et al. |
| 5,610,977 A | 3/1997 | Williams et al. |
| 5,623,532 A | 4/1997 | Houde et al. |
| 5,625,681 A | 4/1997 | Butler, II |
| 5,671,225 A | 9/1997 | Hooper et al. |
| 5,689,548 A | 11/1997 | Maupin et al. |
| 5,689,555 A | 11/1997 | Sonnenberg |
| 5,696,816 A | 12/1997 | Sonnenberg |
| 5,706,286 A | 1/1998 | Reiman et al. |
| 5,711,002 A | 1/1998 | Foti |
| 5,711,011 A | 1/1998 | Urs et al. |
| 5,712,908 A | 1/1998 | Brinkman et al. |
| 5,740,239 A | 4/1998 | Bhagat et al. |
| 5,757,895 A | 5/1998 | Aridas et al. |
| 5,764,745 A | 6/1998 | Chan et al. |
| 5,768,352 A | 6/1998 | Elliott et al. |
| 5,768,358 A | 6/1998 | Venier et al. |
| 5,771,284 A | 6/1998 | Sonnenberg |
| 5,774,532 A | 6/1998 | Gottlieb et al. |
| 5,784,443 A | 7/1998 | Chapman et al. |
| 5,796,813 A | 8/1998 | Sonnenberg |
| 5,812,639 A | 9/1998 | Bartholomew et al. |
| 5,819,178 A | 10/1998 | Cropper |
| 5,822,694 A | 10/1998 | Coombes et al. |
| 5,832,382 A | 11/1998 | Alperovich |
| 5,838,683 A | 11/1998 | Corley et al. |
| 5,854,982 A | 12/1998 | Chambers et al. |
| 5,867,558 A | 2/1999 | Swanson |
| 5,878,126 A | 3/1999 | Velamuri et al. |
| 5,878,347 A | 3/1999 | Joensuu et al. |
| 5,878,348 A | 3/1999 | Foti |
| 5,890,063 A | 3/1999 | Mills |
| 5,903,726 A | 5/1999 | Donovan et al. |
| 5,949,871 A | 9/1999 | Kabay et al. |
| 5,953,662 A | 9/1999 | Lindquist et al. |
| 5,953,663 A | 9/1999 | Maupin et al. |
| 5,983,217 A | 11/1999 | Khosravi-Sichannie et al. |
| 5,999,525 A | 12/1999 | Krishnaswamy et al. |
| 6,006,098 A | 12/1999 | Rathnasabapathy et al. |
| 6,009,160 A | 12/1999 | Sonnenberg |
| 6,011,803 A | 1/2000 | Bicknell et al. |
| 6,014,557 A | 1/2000 | Morton et al. |
| 6,018,657 A | 1/2000 | Kennedy, III et al. |
| 6,021,126 A | 2/2000 | White et al. |
| 6,028,914 A | 2/2000 | Lin et al. |
| 6,038,456 A | 3/2000 | Colby et al. |
| 6,049,714 A | 4/2000 | Patel |
| 6,091,957 A | 7/2000 | Larkins et al. |
| 6,091,959 A | 7/2000 | Souissi et al. |
| 6,094,573 A | 7/2000 | Heinonen et al. |

(56) References Cited

U.S. PATENT DOCUMENTS

| | | |
|---|---|---|
| 6,097,719 A | 8/2000 | Benash et al. |
| 6,097,960 A | 8/2000 | Rathnasabapathy et al. |
| 6,108,332 A | 8/2000 | Kasiviswanathan |
| 6,108,782 A | 8/2000 | Fletcher et al. |
| 6,111,946 A | 8/2000 | O'Brien |
| 6,115,463 A | 9/2000 | Coulombe et al. |
| 6,115,754 A | 9/2000 | Landgren |
| 6,119,014 A | 9/2000 | Alperovich et al. |
| 6,122,510 A | 9/2000 | Granberg |
| H1895 H | 10/2000 | Hoffpauir et al. |
| 6,128,304 A | 10/2000 | Gardell et al. |
| 6,128,377 A | 10/2000 | Sonnenberg |
| 6,134,307 A | 10/2000 | Broukman et al. |
| 6,134,314 A | 10/2000 | Dougherty et al. |
| 6,134,316 A | 10/2000 | Kallioniemi et al. |
| 6,134,432 A | 10/2000 | Holmes et al. |
| 6,134,618 A | 10/2000 | Hebert |
| 6,137,806 A | 10/2000 | Martinez |
| 6,138,016 A | 10/2000 | Kulkarni et al. |
| 6,138,017 A | 10/2000 | Price et al. |
| 6,138,023 A | 10/2000 | Agarwal et al. |
| 6,144,857 A | 11/2000 | Price et al. |
| 6,148,204 A | 11/2000 | Urs et al. |
| 6,181,937 B1 | 1/2001 | Joensuu |
| 6,182,086 B1 | 1/2001 | Lomet et al. |
| 6,188,752 B1 | 2/2001 | Lesley |
| 6,192,242 B1 | 2/2001 | Rollender |
| 6,205,210 B1 | 3/2001 | Rainey et al. |
| 6,215,790 B1 | 4/2001 | Voit et al. |
| 6,219,551 B1 | 4/2001 | Hentilä et al. |
| 6,226,517 B1 | 5/2001 | Britt et al. |
| 6,236,365 B1 | 5/2001 | LeBlanc et al. |
| 6,249,572 B1 | 6/2001 | Brockman et al. |
| 6,252,952 B1 | 6/2001 | Kung et al. |
| 6,263,212 B1 | 7/2001 | Ross et al. |
| 6,272,136 B1 | 8/2001 | Lin et al. |
| 6,301,609 B1 | 10/2001 | Aravamudan et al. |
| 6,304,565 B1 | 10/2001 | Ramamurthy |
| 6,308,075 B1 | 10/2001 | Irten et al. |
| 6,321,268 B1 | 11/2001 | Dillon et al. |
| 6,324,183 B1 | 11/2001 | Miller et al. |
| 6,327,350 B1 | 12/2001 | Spangler et al. |
| 6,333,931 B1 | 12/2001 | LaPier et al. |
| 6,363,411 B1 | 3/2002 | Dugan et al. |
| 6,373,930 B1 | 4/2002 | McConnell et al. |
| 6,377,674 B1 | 4/2002 | Chong et al. |
| 6,393,269 B1 | 5/2002 | Hartmaier et al. |
| 6,411,632 B2 | 6/2002 | Lindgren et al. |
| 6,424,621 B1 | 7/2002 | Ramaswamy et al. |
| 6,424,832 B1 | 7/2002 | Britt et al. |
| 6,430,176 B1 | 8/2002 | Christie, IV |
| 6,434,144 B1 | 8/2002 | Romanov |
| 6,434,155 B1 | 8/2002 | Jones et al. |
| 6,438,223 B1 | 8/2002 | Eskafi et al. |
| 6,446,127 B1 | 9/2002 | Schuster et al. |
| 6,453,034 B1 | 9/2002 | Donovan et al. |
| 6,453,158 B2 | 9/2002 | Donovan et al. |
| 6,456,708 B1 | 9/2002 | Copley et al. |
| 6,463,055 B1 | 10/2002 | Lupien et al. |
| 6,466,796 B1 | 10/2002 | Jacobson et al. |
| 6,470,179 B1 | 10/2002 | Chow et al. |
| 6,480,588 B1 | 11/2002 | Donovan |
| 6,496,690 B1 | 12/2002 | Cobo et al. |
| 6,505,046 B1 | 1/2003 | Baker |
| 6,510,164 B1 | 1/2003 | Ramaswamy et al. |
| 6,515,997 B1 | 2/2003 | Feltner et al. |
| 6,516,194 B2 | 2/2003 | Hanson |
| 6,535,727 B1 | 3/2003 | Abbasi et al. |
| 6,535,746 B1 | 3/2003 | Yu et al. |
| 6,539,077 B1 | 3/2003 | Ranalli et al. |
| 6,560,216 B1 | 5/2003 | McNiff et al. |
| 6,560,456 B1 | 5/2003 | Lohtia et al. |
| 6,564,261 B1 | 5/2003 | Gudjonsson et al. |
| 6,571,094 B1 | 5/2003 | Begeja et al. |
| 6,574,481 B1 | 6/2003 | Rathnasabapathy et al. |
| 6,577,723 B1 | 6/2003 | Mooney |
| 6,584,183 B2 | 6/2003 | Manto |
| 6,594,258 B1 | 7/2003 | Larson et al. |
| 6,611,516 B1 | 8/2003 | Pirkola et al. |
| 6,633,764 B1 | 10/2003 | Garcia |
| 6,643,511 B1 | 11/2003 | Rune et al. |
| 6,662,017 B1 | 12/2003 | McCann et al. |
| 6,683,881 B1 | 1/2004 | Mijares et al. |
| 6,684,073 B1 | 1/2004 | Joss et al. |
| 6,718,178 B1 | 4/2004 | Sladek et al. |
| 6,731,741 B1 | 5/2004 | Fourcand et al. |
| 6,731,926 B1 | 5/2004 | Link, II et al. |
| 6,738,636 B2 | 5/2004 | Lielbriedis |
| 6,747,970 B1 | 6/2004 | Lamb et al. |
| 6,748,057 B2 | 6/2004 | Ranalli et al. |
| 6,760,343 B1 | 7/2004 | Krishnamurthy et al. |
| 6,775,737 B1 | 8/2004 | Warkhede et al. |
| 6,795,701 B1 | 9/2004 | Baker et al. |
| 6,801,781 B1 | 10/2004 | Provost et al. |
| 6,836,477 B1 | 12/2004 | West, Jr. et al. |
| 6,839,421 B2 | 1/2005 | Ferraro Esparza et al. |
| 6,865,266 B1 | 3/2005 | Pershan |
| 6,871,070 B2 | 3/2005 | Ejzak |
| 6,873,849 B2 | 3/2005 | de la Red et al. |
| 6,885,872 B2 | 4/2005 | McCann et al. |
| 6,917,612 B2 | 7/2005 | Foti et al. |
| 6,944,666 B2 | 9/2005 | Belkin |
| 6,950,441 B1 | 9/2005 | Kaczmarczyk et al. |
| 6,963,583 B1 | 11/2005 | Foti |
| 6,968,052 B2 | 11/2005 | Wullert, II |
| 6,993,038 B2 | 1/2006 | McCann |
| 7,010,002 B2 | 3/2006 | Chow et al. |
| 7,010,114 B2 | 3/2006 | Stahl et al. |
| 7,027,433 B2 | 4/2006 | Touhino et al. |
| 7,027,582 B2 | 4/2006 | Khello et al. |
| 7,035,239 B2 | 4/2006 | McCann et al. |
| 7,039,037 B2 | 5/2006 | Wang et al. |
| 7,054,652 B2 | 5/2006 | Luis |
| 7,058,036 B1 | 6/2006 | Yu et al. |
| 7,079,524 B2 | 7/2006 | Bantukul et al. |
| 7,079,853 B2 | 7/2006 | Rathnasabapathy et al. |
| 7,085,260 B2 | 8/2006 | Karaul et al. |
| 7,092,505 B2 | 8/2006 | Allison et al. |
| 7,170,982 B2 | 1/2007 | Li et al. |
| 7,221,952 B2 | 5/2007 | Cho et al. |
| 7,260,207 B2 | 8/2007 | Marsico |
| 7,274,683 B2 | 9/2007 | Segal |
| 7,286,839 B2 | 10/2007 | McCann et al. |
| 7,366,530 B2 | 4/2008 | McCann et al. |
| 7,397,773 B2 | 7/2008 | Qu et al. |
| 7,415,007 B2 | 8/2008 | Huang |
| 7,457,283 B2 | 11/2008 | Dalton, Jr. et al. |
| 7,551,608 B1 | 6/2009 | Roy |
| 7,627,108 B1 | 12/2009 | Enzmann et al. |
| 7,664,495 B1 | 2/2010 | Bonner et al. |
| 7,693,135 B2 | 4/2010 | Pershan |
| 7,715,367 B2 | 5/2010 | Nishida et al. |
| 7,746,864 B1 | 6/2010 | Asawa et al. |
| 7,751,386 B2 | 7/2010 | Kobayashi et al. |
| 7,756,518 B2 | 7/2010 | Xu et al. |
| 7,787,445 B2 | 8/2010 | Marsico |
| 7,787,878 B2 | 8/2010 | Li et al. |
| 7,805,532 B2 | 9/2010 | Pattison et al. |
| 7,856,094 B2 | 12/2010 | Khadri et al. |
| 7,860,231 B2 | 12/2010 | Florkey et al. |
| 7,864,752 B1 | 1/2011 | Bennett et al. |
| 7,889,716 B2 | 2/2011 | Tejani et al. |
| 7,948,978 B1 | 5/2011 | Rogers et al. |
| 7,984,130 B2 | 7/2011 | Bogineni et al. |
| 7,996,541 B2 | 8/2011 | Marathe et al. |
| 8,027,319 B2 | 9/2011 | Chin et al. |
| 8,050,253 B2 | 11/2011 | Kalyanpur et al. |
| 8,073,127 B2 | 12/2011 | Bantukul et al. |
| 8,184,798 B2 | 5/2012 | Waitrowski et al. |
| 8,224,337 B2 | 7/2012 | Gosnell et al. |
| 8,254,551 B2 | 8/2012 | Heinze et al. |
| 8,452,325 B2 | 5/2013 | McCann |
| 8,538,000 B2 | 9/2013 | Bantukul et al. |
| 8,594,679 B2 | 11/2013 | Agarwal et al. |

(56) References Cited

U.S. PATENT DOCUMENTS

| | | |
|---|---|---|
| 8,649,498 B1 | 2/2014 | Rankin et al. |
| 9,219,677 B2 | 12/2015 | McCann et al. |
| 2001/0008532 A1 | 7/2001 | Lee |
| 2001/0029182 A1 | 10/2001 | McCann et al. |
| 2001/0030957 A1 | 10/2001 | McCann et al. |
| 2001/0031641 A1 | 10/2001 | Ung et al. |
| 2001/0034224 A1 | 10/2001 | McDowell et al. |
| 2001/0040957 A1 | 11/2001 | McCann et al. |
| 2001/0055380 A1 | 12/2001 | Benedyk et al. |
| 2002/0029189 A1 | 3/2002 | Titus et al. |
| 2002/0048360 A1 | 4/2002 | Zambre et al. |
| 2002/0054667 A1* | 5/2002 | Martinez ............ 379/45 |
| 2002/0054674 A1 | 5/2002 | Chang et al. |
| 2002/0058507 A1 | 5/2002 | Valentine et al. |
| 2002/0095421 A1 | 7/2002 | Koskas |
| 2002/0111153 A1 | 8/2002 | Hartmaier et al. |
| 2002/0114440 A1 | 8/2002 | Madour et al. |
| 2002/0122547 A1 | 9/2002 | Hinchey et al. |
| 2002/0147845 A1 | 10/2002 | Sanchez-Herrero et al. |
| 2002/0150079 A1 | 10/2002 | Zabawskyj et al. |
| 2002/0173320 A1 | 11/2002 | Aitken et al. |
| 2002/0176382 A1 | 11/2002 | Madour et al. |
| 2002/0176562 A1 | 11/2002 | Hao |
| 2003/0007482 A1 | 1/2003 | Khello et al. |
| 2003/0013464 A1 | 1/2003 | Jean Henry-Laborderie |
| 2003/0026289 A1 | 2/2003 | Mukherjee et al. |
| 2003/0031160 A1 | 2/2003 | Gibson Ang et al. |
| 2003/0037108 A1 | 2/2003 | Peiffer et al. |
| 2003/0054844 A1 | 3/2003 | Anvekar et al. |
| 2003/0061234 A1* | 3/2003 | Ali et al. ............ 707/104.1 |
| 2003/0065788 A1 | 4/2003 | Salomaki |
| 2003/0081754 A1 | 5/2003 | Esparza et al. |
| 2003/0095541 A1 | 5/2003 | Chang et al. |
| 2003/0109271 A1 | 6/2003 | Lewis et al. |
| 2003/0128693 A1 | 7/2003 | Segal |
| 2003/0177281 A1 | 9/2003 | McQuillan et al. |
| 2003/0181206 A1 | 9/2003 | Zhou et al. |
| 2003/0193967 A1 | 10/2003 | Fenton et al. |
| 2003/0203740 A1 | 10/2003 | Bahl et al. |
| 2003/0220951 A1 | 11/2003 | Muthulingam et al. |
| 2003/0227899 A1 | 12/2003 | McCann |
| 2003/0231623 A1 | 12/2003 | Ryu et al. |
| 2004/0003037 A1 | 1/2004 | Fujimoto et al. |
| 2004/0003114 A1 | 1/2004 | Adamczyk |
| 2004/0024894 A1 | 2/2004 | Osman et al. |
| 2004/0034699 A1 | 2/2004 | Gotz et al. |
| 2004/0052240 A1* | 3/2004 | Stahl et al. ............ 370/351 |
| 2004/0053604 A1 | 3/2004 | Ratilainen et al. |
| 2004/0053610 A1 | 3/2004 | Kim |
| 2004/0076126 A1 | 4/2004 | Qu et al. |
| 2004/0081206 A1 | 4/2004 | Allison et al. |
| 2004/0082332 A1 | 4/2004 | McCann et al. |
| 2004/0087300 A1 | 5/2004 | Lewis |
| 2004/0125925 A1 | 7/2004 | Marsot |
| 2004/0131052 A1* | 7/2004 | Smith et al. ............ 370/352 |
| 2004/0141488 A1 | 7/2004 | Kim et al. |
| 2004/0142707 A1 | 7/2004 | Midkiff et al. |
| 2004/0153506 A1 | 8/2004 | Ito et al. |
| 2004/0184435 A1 | 9/2004 | Westman |
| 2004/0196963 A1 | 10/2004 | Appelman et al. |
| 2004/0198351 A1 | 10/2004 | Knotts |
| 2004/0202187 A1 | 10/2004 | Kelly et al. |
| 2004/0233840 A1 | 11/2004 | Bye |
| 2004/0243596 A1 | 12/2004 | Lillqvist et al. |
| 2004/0246965 A1 | 12/2004 | Westman et al. |
| 2004/0264671 A1 | 12/2004 | Lamberton et al. |
| 2005/0003838 A1 | 1/2005 | McCann et al. |
| 2005/0027867 A1 | 2/2005 | Mueller et al. |
| 2005/0053213 A1* | 3/2005 | Giannoit ............ 379/201.12 |
| 2005/0070310 A1 | 3/2005 | Caspi et al. |
| 2005/0100145 A1 | 5/2005 | Spencer et al. |
| 2005/0101297 A1 | 5/2005 | Delaney et al. |
| 2005/0119017 A1 | 6/2005 | Lovell, Jr. et al. |
| 2005/0143075 A1 | 6/2005 | Halsell |
| 2005/0176448 A1 | 8/2005 | Klockner |
| 2005/0182781 A1 | 8/2005 | Bouvet |
| 2005/0202836 A1 | 9/2005 | Schaedler et al. |
| 2005/0220288 A1* | 10/2005 | Huey ............ 379/265.02 |
| 2005/0251509 A1 | 11/2005 | Pontius |
| 2005/0286531 A1 | 12/2005 | Tuohino et al. |
| 2006/0002308 A1 | 1/2006 | Na et al. |
| 2006/0034256 A1 | 2/2006 | Addagatla et al. |
| 2006/0034270 A1 | 2/2006 | Haase et al. |
| 2006/0067338 A1 | 3/2006 | Hua et al. |
| 2006/0072726 A1 | 4/2006 | Klein et al. |
| 2006/0077957 A1 | 4/2006 | Reddy et al. |
| 2006/0095575 A1 | 5/2006 | Sureka et al. |
| 2006/0098621 A1 | 5/2006 | Plata et al. |
| 2006/0105766 A1 | 5/2006 | Azada et al. |
| 2006/0136557 A1 | 6/2006 | Schaedler et al. |
| 2006/0165068 A1 | 7/2006 | Dalton et al. |
| 2006/0209791 A1* | 9/2006 | Khadri et al. ............ 370/352 |
| 2006/0225128 A1 | 10/2006 | Aittola et al. |
| 2006/0245573 A1 | 11/2006 | Sheth et al. |
| 2006/0291488 A1 | 12/2006 | Naqvi et al. |
| 2006/0293021 A1 | 12/2006 | Zhou |
| 2007/0019625 A1 | 1/2007 | Ramachandran et al. |
| 2007/0061397 A1 | 3/2007 | Gregorat et al. |
| 2007/0104184 A1 | 5/2007 | Ku et al. |
| 2007/0115934 A1 | 5/2007 | Dauster et al. |
| 2007/0116250 A1 | 5/2007 | Stafford |
| 2007/0121875 A1* | 5/2007 | Gruchala et al. ....... 379/212.01 |
| 2007/0121879 A1 | 5/2007 | McGary et al. |
| 2007/0121908 A1* | 5/2007 | Benedyk et al. ............ 379/350 |
| 2007/0127436 A1 | 6/2007 | Karimi-Cherkandi et al. |
| 2007/0133574 A1 | 6/2007 | Tejani et al. |
| 2007/0133757 A1 | 6/2007 | Girouard et al. |
| 2007/0153995 A1 | 7/2007 | Fang et al. |
| 2007/0167166 A1* | 7/2007 | Fleischer et al. ............ 455/440 |
| 2007/0191003 A1 | 8/2007 | Smith et al. |
| 2007/0203909 A1 | 8/2007 | Marathe |
| 2007/0238465 A1 | 10/2007 | Han et al. |
| 2007/0243876 A1 | 10/2007 | Duan |
| 2007/0258575 A1 | 11/2007 | Douglas et al. |
| 2007/0286379 A1 | 12/2007 | Wiatrowski et al. |
| 2008/0013533 A1 | 1/2008 | Bogineni et al. |
| 2008/0019356 A1 | 1/2008 | Marsico |
| 2008/0037759 A1 | 2/2008 | Chin et al. |
| 2008/0081754 A1 | 4/2008 | Plemons et al. |
| 2008/0084975 A1 | 4/2008 | Schwartz |
| 2008/0109532 A1 | 5/2008 | Denoual et al. |
| 2008/0112399 A1 | 5/2008 | Cohen et al. |
| 2008/0114862 A1 | 5/2008 | Moghaddam et al. |
| 2008/0130856 A1 | 6/2008 | Ku et al. |
| 2008/0137832 A1 | 6/2008 | Heinze et al. |
| 2008/0171544 A1 | 7/2008 | Li et al. |
| 2008/0198862 A1 | 8/2008 | Bantukul et al. |
| 2008/0198996 A1 | 8/2008 | Bantukul et al. |
| 2008/0215740 A1* | 9/2008 | Gruchala et al. ............ 709/227 |
| 2008/0247526 A1 | 10/2008 | Qui et al. |
| 2008/0253362 A1* | 10/2008 | Samarasinghe et al. ..... 370/352 |
| 2008/0260119 A1 | 10/2008 | Marathe et al. |
| 2008/0281975 A1 | 11/2008 | Qui et al. |
| 2008/0285438 A1 | 11/2008 | Marathe et al. |
| 2008/0310613 A1* | 12/2008 | Fleischer et al. ....... 379/221.14 |
| 2008/0311917 A1 | 12/2008 | Marathe et al. |
| 2009/0022146 A1 | 1/2009 | Huang |
| 2009/0041225 A1* | 2/2009 | Agarwal et al. ......... 379/221.13 |
| 2009/0043704 A1 | 2/2009 | Bantukul et al. |
| 2009/0074174 A1 | 3/2009 | Allen et al. |
| 2009/0103707 A1 | 4/2009 | McGary et al. |
| 2009/0193071 A1 | 7/2009 | Qiu et al. |
| 2009/0227276 A1* | 9/2009 | Agarwal et al. ............ 455/466 |
| 2009/0264112 A1 | 10/2009 | De Zen et al. |
| 2009/0296694 A1 | 12/2009 | Kalyanpur et al. |
| 2010/0020728 A1 | 1/2010 | Jefferson et al. |
| 2010/0040029 A1* | 2/2010 | Doppler et al. ............ 370/338 |
| 2010/0042525 A1 | 2/2010 | Cai et al. |
| 2010/0056100 A1* | 3/2010 | Elman et al. ............ 455/404.1 |
| 2010/0093307 A1* | 4/2010 | Hui et al. ............ 455/404.2 |
| 2010/0177780 A1 | 7/2010 | Ophir et al. |
| 2010/0202446 A1 | 8/2010 | McCann et al. |
| 2010/0285800 A1 | 11/2010 | McCann |
| 2010/0299451 A1 | 11/2010 | Yigang et al. |

(56) References Cited

U.S. PATENT DOCUMENTS

| | | | |
|---|---|---|---|
| 2011/0098049 A1 | 4/2011 | Gosnell et al. | |
| 2011/0116382 A1 | 5/2011 | McCann et al. | |
| 2011/0126277 A1 | 5/2011 | McCann et al. | |

FOREIGN PATENT DOCUMENTS

| | | | |
|---|---|---|---|
| EP | 0 088 639 | | 9/1983 |
| EP | 0 212 654 | | 5/1987 |
| EP | 0 258 654 | | 3/1988 |
| EP | 0 264 023 | | 4/1988 |
| EP | 0 512 962 | A2 | 11/1992 |
| EP | 0 669 771 | A1 | 8/1995 |
| EP | 0 936 825 | A3 | 8/1999 |
| EP | 0 944 276 | A1 | 9/1999 |
| EP | 1 100 279 | A2 | 5/2001 |
| EP | 1 285 545 | B1 | 10/2004 |
| EP | 1 558 004 | A | 7/2005 |
| EP | 1 742 452 | A1 | 1/2007 |
| EP | 1 282 983 | B1 | 8/2010 |
| EP | 1 958 399 | B1 | 2/2012 |
| EP | 1 676 386 | B1 | 4/2013 |
| GB | 2 382 267 | | 5/2003 |
| JP | 58-215164 | | 12/1983 |
| JP | 62-200859 | | 9/1987 |
| KR | 2000-0037801 | | 7/2000 |
| KR | 10-1998-0052565 | | 5/2001 |
| KR | 1020030025024 | A | 3/2003 |
| KR | 2003-0040291 | A1 | 5/2003 |
| KR | 10-2003-0066043 | | 8/2003 |
| KR | 10-2004-0107271 | A | 12/2004 |
| KR | 10-2006-0090378 | | 8/2006 |
| KR | 10-2007-0061774 | | 6/2007 |
| KR | 10-2007-0093383 | | 9/2007 |
| WO | WO 84/01073 | | 3/1984 |
| WO | WO 86/03915 | | 7/1986 |
| WO | WO 88/00419 | | 1/1988 |
| WO | WO 95/12292 | A1 | 5/1995 |
| WO | WO 96/11557 | | 4/1996 |
| WO | WO 97/33441 | | 9/1997 |
| WO | WO 98/18269 | | 4/1998 |
| WO | WO 98/56195 | | 12/1998 |
| WO | WO 99/11087 | A2 | 3/1999 |
| WO | WO 99/14910 | | 3/1999 |
| WO | WO 99/57926 | | 11/1999 |
| WO | WO 00/16583 | | 3/2000 |
| WO | WO 00/60821 | | 10/2000 |
| WO | WO 01/20920 | A1 | 3/2001 |
| WO | WO 01/47297 | A2 | 6/2001 |
| WO | WO 01/48981 | A1 | 7/2001 |
| WO | WO 01/54444 | A1 | 7/2001 |
| WO | WO 01/56308 | A2 | 8/2001 |
| WO | WO 02/096147 | | 11/2002 |
| WO | WO 03/005664 | A2 | 1/2003 |
| WO | WO 03/105382 | A1 | 12/2003 |
| WO | WO 2004/006534 | | 1/2004 |
| WO | WO 2004/008786 | A | 1/2004 |
| WO | WO 2004/075507 | | 9/2004 |
| WO | WO 2004/102345 | A2 | 11/2004 |
| WO | WO 2005/013538 | A3 | 2/2005 |
| WO | WO 2006/031678 | A2 | 3/2006 |
| WO | WO 2006/072473 | A1 | 7/2006 |
| WO | WO 2006/102339 | A2 | 9/2006 |
| WO | WO 2007/045991 | A1 | 4/2007 |
| WO | WO 2007/064943 | A2 | 6/2007 |
| WO | WO 2007/146257 | A2 | 12/2007 |
| WO | WO 2008/011101 | A2 | 1/2008 |
| WO | WO 2008/073226 | | 6/2008 |
| WO | WO 2008/157213 | A2 | 12/2008 |
| WO | WO 2009/018418 | A2 | 2/2009 |
| WO | WO 2009/023573 | A2 | 2/2009 |
| WO | WO 2009/070179 | A1 | 6/2009 |
| WO | WO 2010/083509 | A2 | 7/2010 |
| WO | WO 2011/047382 | A2 | 4/2011 |

OTHER PUBLICATIONS

Applicant-Initiated Interview Summary for U.S. Appl. No. 12/689,702 (Jun. 5, 2012).

Non-Final Official Action for U.S. Appl. No. 12/689,702 (Feb. 2, 2012).

Notification of Transmittal of the International Search Report and the Written Opinion of the International Searching Authority, or the Declaration for International Application No. PCT/US2010/021374 (Aug. 19, 2010).

Notification of Transmittal of the International Search Report and the Written Opinion of the International Searching Authority, or the Declaration for International Application No. PCT/US2009/065745 (Jun. 15, 2010).

"3rd Generation Partnership Project; Technical Specification Group Core Network and Terminals; IP Multimedia Call Control Protocol Based on Session Initiation Protocol (SIP) and Session Description Protocol (SDP); Stage 3 (Release 5)," 3GPP TS 24.229 V5.22.0 (Sep. 2008).

"BICC Architecture and BICC Protocol Details," Tekelec, p. 28-41 (2008).

"BICC Signaling Router (BSR) Reference Architecture (WP005274)," Tekelec, p. 2-91 (2008).

"GPRS Tunneling Protocol (GTP)," Trillium, Continuous Computing, pp. 1-3 (Copyright 2007).

"Telecommunications and Internet Converged Services and Protocols for Advanced Networking (TISPAN); Interworking Between Session Initiation Protocol (SIP) and Bearer Independent Call Control (BICC) Protocol or ISDN User Part (ISUP)," ETSI EN 383 001 V1.1.1 (Jun. 2006).

Jennings et al., "Session Initiation Protocol (SIP) URIs for Application such as Voicemail and Interactive Voice Response (IVR)," The Internet Society, RFC 4458 (Apr. 2006).

"Gateway Control Protocol: Version 3," Series H: Audiovisual and Multimedia Systems; Infrastructure of Audiovisual Services—Communication Procedures, ITU-T H.248.1 (Sep. 2005).

"Interworking Between Session Initiation Protocol (SIP) and Bearer Independent Call Control Protocol or ISDN User Part," ITU-T Q.1912.5, p. 1-101 (Mar. 2004).

"Services and Protocols for Advanced Networks (SPAN); Bearer Independent Call Control (BICC) Capability Set 2 (CS2); Protocol Specification," ETSI EN 302 213 V1.1.2 (Jan. 2004).

"Telecommunications and Internet Protocol Harmonization Over Networks (TIPHON) Release 4; Technology Mapping; Implementation of TIPHON Architecture Using BICC," ETSI TS 102 228 V4.1.1 (Nov. 2003).

Camarillo et al., "Mapping of Integrated Services Digital Network (ISDN) User Part (ISUP) Overlap Signalling to the Session Initiation Protocol (SIP)," Network Working Group, RFC 3578 (Aug. 2003).

Garcia-Martin et al., "Private Header (P-Header) Extensions to the Session Initiation Protocol (SIP) for the 3rd-Generation Partnership Project (3GPP)," Network Working Group, RFC 3455 (Jan. 2003).

"Series Q: Switching and Signalling; Broadband ISDN—Signalling ATM Adaptation Layer (SAAL); Signalling Transport converter on SCTP," ITU-T Q.2150.3 (Dec. 2002).

"Bearer Independent Call Bearer Control Protocol," ITU-T Q.1950, p. 1-96 (Dec. 2002).

Camarillo et al., "Integrated Services Digital Network (ISDN) User Part (ISUP) to Session Initiation Protocol (SIP) Mapping," Network Working Group, RFC 3398 (Dec. 2002).

Vemuri et al., "Session Initiation Protocol for Telephones (SIP-T): Context and Architectures," Network Working Group, RFC 3372 (Sep. 2002).

Chang, "BICC Extension of SIP in Inter-Network Configuration," Internet Engineering Task Force, draft-chang-sipping-bicc-network-00.txt, pp. 1-17 (Mar. 2002).

Multiservice Switching Forum, "Implementation Agreement for BICC," MSF-IA-BICC.001-FINAL (Feb. 2002).

Marshall et al., "SIP Extensions for Supporting Distributed Call State," SIP Working Group, Internet Draft, pp. 1-12 (Aug. 2001).

"Series Q: Switching and Signalling; Specification of Signalling Related to Bearer Independent Call Control (BICC); Bearer Inde-

(56) References Cited

OTHER PUBLICATIONS pendent Call Control Protocol (Capability Set 2): Basic Call Procedures," ITU-T Q.1902.4 (Jul. 2001).
"Bearer Independent Call Control Protocol (Capability Set 2) and Signalling System No. 7 ISDN User Part: Formats and Codes," ITU-T Q.1902.3, p. 1-141 (Jul. 2001).
"Bearer Independent Call Control Protocol (Capability Set 2) and Signaling System No. 7 ISDN user part: General Functions of Messages and Parameters," ITU-T Q.1902.2 (Jul. 2001).
"Bearer Independent Call Control Protocol (Capability Set 2): Functional Description," ITU-T Q.1902.1, p. 1-23 (Jul. 2001).
"Series Q: Switching and Signalling, Specification of Signalling Related to Bearer Independent Call Control (BICC); BICC Bearer Control Tunnelling Protocol," ITU-T Q.1990 (Jul. 2001).
"Series Q: Switching and Signalling; Specifications of Signalling System No. 7—ISDN User Part; Signalling System No. 7—Application Transport Mechanism: Bearer Independent Call Control (BICC); Amendment 1: Bearer Independent Call Control Capability Set 2," ITU-T Q.765.5 (Jul. 2001).
"Series Q: Switching and Signalling; Specifications of Signalling Related to Bearer Independent Call Control (BICC): Interworking Between Signalling System No. 7 ISDN User Part and the Bearer Independent Call Control Protocol," ITU-T Q.1912.1 (Jul. 2001).
"Series Q: Switching and Signalling; Interworking Between Selected Signalling Systems (PSTN Access, DSS1, C5, R1, R2, TUP) and the Bearer Independent Call Control Protocol," ITU-T Q.1912.2 (Jul. 2001).
"Signalling Transport Converter on MTP3 and MTP3b," ITU-T Q.2150.1 (May 2001).
"Generic Signalling Transport Service," ITU-T Q.2150.0 (May 2001).
"ITU-Q1970: Draft New ITU-T Recommendation Q.1970 BICC IP Bearer Control Protocol," Network Dictionary (2001).
"Gateway Control Protocol: Transport Over Stream Control Transmission Protocol (SCTP)," Series H: Audiovisual and Multimedia Systems; Infrastructure of Audiovisual Services—Communication Procedures, H.248.4 (Nov. 2000).
"Bearer Independent Call Control Protocol," ITU-T Q.1901 (Jun. 2000).
Sugano et al., "Presence Information Data Format for IMPP," Internet draft, draft-ietf-impp-pidf-01.text, Network Working Group, pp. 1-17 (Mar. 10, 2000).
"Signalling System No. 7—ISDN User Part Enhancements for the Support of Number Portability," ITU-T Q.769.1 (Dec. 1999).
"Signalling System No. 7—ISDN User Part Formats and Codes," ITU-T Q.763 (Dec. 1999).
"Signalling System No. 7—ISDN User Part General Functions of Messages and Signals," ITU-T Q.762 (Dec. 1999).
"Signalling System No. 7—ISDN User Part Functional Description," ITU-T Q.761 (Dec. 1999).
"Series Q: Switching and Signalling; Specifications of Signalling System No. 7—ISDN Supplementary Services; ISDN User Part Supplementary Services," ITU-T Q.730 (Dec. 1999).
Liao et al., "SS7-TCAP/IP Interworking," Internet Engineering Task Force, pp. 1-14 (Mar. 1999).
De Ment, "The Evolution of Signaling," NMS Communications, p. 1-28 (Publication Date Unknown).
"Mobile Wireless Overview," Cisco IOS Mobile Wireless Configuration Guide, pp. MWC-1-MWC-8 (Publication Date Unknown).
Advisory Action and Examiner-Initiated Interview Summary for U.S. Appl. No. 12/689,702 (Jan. 15, 2014).
Final Office Action for U.S. Appl. No. 12/689,702 (Aug. 15, 2013).
Hearing notice for India Patent Application No. 2112/CHENP/2009 (Aug. 8, 2016).
Communication of the extended European search report for European Patent Application No. 097178651 (Jul. 17, 2015).
"Address Resolution in MMS (Re: SerG LS E.164 Address Sch," 3GPP TSG-T WG2-SWG3, vol. T WG2, No. Camcun, Mexico 2001126-20011130 http://www.3gpp.org/ftp/tsg_t/WG2_Capability/TSGT2_15_Cancun/Docs/ (Dec. 4, 2001).

Notice of Allowance and Fee(s) Due and Examiner-Initiated Interview Summary for U.S. Appl. No. 12/689,702 (Aug. 19, 2015).
Non-Final Office Action for U.S. Appl. No. 12/400,576 dated Aug. 24, 2011.
Final Office Action for U.S. Appl. No. 12/400,576 dated Mar. 9, 2012.
Advisory Action for U.S. Appl. No. 12/400,576 dated Jun. 26, 2012.
Notice of Allowance for U.S. Appl. No. 12/400,576 dated Jul. 19, 2013.
3rd Generation Partnership Project, "Technical Specification Group Core Network and Terminals; Diameter based protocols to support Short Message Service (SMS) capable Mobile Management Entities (MMEs)," 3GPP TS 29.338, V12.0.0, pp. 1-40 (Mar. 2013).
3rd Generation Partnership Project, "Technical Specification Group Services and System Aspects; Circuit Switched (CS) fallback in Evolved Packet System (EPS); Stage 2," 3GPP TS 23.272, V10.10.0, pp. 1-84 (Mar. 2013).
"Digital cellular telecommunications system (Phase 2+); Universal Mobile Telecommunications System (UMTS); LTE; Circuit Switched (CS) fallback in Evolved Packet System (EPS); Stage 2," ETSI TS 123 272, V11.3.0, pp. 1-93 (Jan. 2013).
Notice of Publication of Abstract for Indian Patent Application No. 6406/CHENP/2010 A (Jun. 17, 2011).
"Ericsson Unified Number Portability," (Downloaded from the Internet on Jan. 24, 2011).
Tsou et al., "Realm-Based Redirection in Diameter," draft-ietf-dime-realm-based-redirect-03, RFC 3588, pp. 1-6 (Jul. 12, 2010).
"3rd Generation Partnership Project; Technical Specification Group Core Network and Terminals; Policy and Charging Control signalling flows and Quality of Service (QoS) parameter mapping (Release 9)," 3GPP TS 29.213, V9.2.0, pp. 1-129 (Mar. 2010).
Korhonen et al., "Clarifications on the Routing of Diameter Requests Based on the Username and the Realm," RFC 5729, pp. 1-9 (Dec. 2009).
Notification of Transmittal of the International Search Report and the Written Opinion of the International Searching Authority, or the Declaration for International application No. PCT/US2009/036538 (Sep. 30, 2009).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 9)," 3GPP TS 29.272, V9.0.0, pp. 1-71 (Sep. 2009).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 8)," 3GPP TS 29.272 V8.4.0, pp. 1-71 (Sep. 2009).
Jones et al., "Diameter Command Code Registration for the Third Generation Partnership Project (3GPP) Evolved Packet System (EPS)," Network Working Group, RFC 5516, pp. 1-5 (Apr. 2009).
"3rd Generation Partnership Project; Technical Specification Group Services and System Aspects; Policy and charging control architecture (Release 8)," 3GPP TS 23.203, V8.1.1, pp. 1-87 (Mar. 2008).
"IP Multimedia Subsystem," printout from wikipedia.org, Wikimedia Foundation, Inc. (May 29, 2007).
"HP OperCall Home Subscriber Server Software—Data Sheet", 4AA0-3360ENW Rev. 2, Hewlett-Packard Development Company, L.P. (Jul. 2006).
Lucent Technologies, "ENUM Use and Management for the Successful Deployment of ENUM-Enabled Services; Understand ENUM and its Deployment to Insure Success of your VoIP and Other ENUM-enabled Services," White Paper, pp. 1-12 (Jul. 2006).
Tschofenig et al., "Securing the Next Steps in Signaling (NSIS) Protocol Suite," International Journal of Internet Protocol Technology, vol. 1, pp. 1-14 (2006).
Stiemerling et al., "NAT/Firewall NSIS Signaling Layer Protocol (NSLP)," draft-ietf-nsis-nslp-natfw-06, pp. 1-70 (May 16, 2005).
Schwarz, "ENUM Trial to Link Phone, Internet Addresses," (Mar. 22, 2005).
Peterson, "Telephone Number Mapping (ENUM) Service Registration for Presence Services," Network Working Group, RFC 3953 (Jan. 2005).

(56) References Cited

OTHER PUBLICATIONS

Jones, "The Definitive Guide to Scaling Out SQL Server," http://www.snip.gob.ni/Xdc/SQL/DGSOSSFinal.pdf (Retrieved on Aug. 16, 2010) (2005).
3GPP, "3rd Generation Partnership Project; Technical Specification Group Core Network; Support of Mobile Number Portability (MNP); Technical Realization; Stage 2 (Release 6)," 3GPP TS 23.066, V6.0.0, pp. 1-83 (Dec. 2004).
Peterson et al., "Using E.164 Numbers With the Session Initiation Protocol (SIP)," Network Working Group, RFC 3824, pp. 1-14 (Jun. 2004).
"Cisco IP Transfer Point as the Signaling Gateway for the Cisco BTS 10200 Softswitch," Cisco Systems, Inc., pp. 1-10 (Summer 2004).
"Cisco IP Transfer Point as the Signaling Gateway for the Cisco PGW 2200 Softswitch," Cisco Systems, Inc., pp. 1-11 (Summer 2004).
"Next-Generation Signaling Transports Cisco IP Transfer Point," Cisco Systems, Inc., pp. 1-27 (Summer 2004).
"A Study in Mobile Messaging: The Evolution of Messaging in Mobile Networks, and How to Efficiently and Effectively Manage the Growing Messaging Traffic," White Paper, Cisco Systems, Inc., pp. 1-6 (Spring 2004).
Walker, "The IP Revolution in Mobile Messaging," Packet, Cisco Systems Users Magazine, vol. 16, No. 1, pp. Cover; 73-74; and 89 (First Quarter 2004).
"Cisco ITP Multilayer Routing (MLR) SMS MO Routing Requirements," Cisco Systems, Inc., p. 1 (Copyright 2004).
"Cisco Signaling Gateway Manager Release 3.2 for Cisco IP Transfer Point," Cisco Systems, Inc., pp. 1-9 (Copyright 1992-2004).
"Solutions for Mobile Network Operators," Cisco Systems, Inc., pp. 1-8 (Copyright 1992-2004).
Cisco, "Quality of Service Networks," Internetworking Technologies Handbook, Chapter 49, pp. 49-1-49-32 (Sep. 11, 2003).
Calhoun et al., "Diameter Base Protocol," RFC 3588, pp. 1-90 (Sep. 2003).
Moodie, "Agilent acceSS7: White Paper," Agilent Technologies, pp. 1-14 (Apr. 1, 2003).
Foster et al., "Number Portability in the Global Switched Telephone Network (GSTN): An Overview," Network Working Group, RFC 3482 (Feb. 2003).
Loshin, "19.4: Network Address Translation," TCP/IP Clearly Explained, Fourth Edition, Morgan Kaufman Publishers, pp. 435-437 (2003).
"Cisco IP Transfer Point," Cisco Systems, Inc., pp. 1-10 (Copyright 1992-2003).
"Cisco IP Transfer Point Multilayer Short Message Serivce Routing Solution," Cisco Systems, Inc., pp. 1-6 (Copyright 1992-2003).
"Cisco ITP MAP Gateway for Public WLAN Slm Authentication and Authorization," Cisco Systems, Inc., pp. 1-13 (Copyright 1992-2003).
Barry, "A Signal for Savings," Packet, Cisco Systems Users Magazine, vol. 14, No. 4, pp. Cover; 19-21; and 81 (Fourth Quarter 2002).
"Global Implementation of ENUM: A Tutorial Paper," International Telecommunication Union, Telecommunication Standardization Union, Study Group 2, (Feb. 8, 2002).
"Agilent Tchnologies and Cisco Systems SS7 Over IP White Paper," Cisco Systems, Inc. and Agilent and Technologies, pp. 1-6 (Copyright 2002—Printed in the UK Feb. 1, 2002).
"Cisco IP Transfer Point: MTP3 User Adaptation (M3UA) and SCCP User Adaptation (SUA) Signaling Gateway," Cisco Systems, Inc., pp. 1-14 (Copyright 2002).
"Cisco SS7 Port Adapter for the Cisco 7500 Versatile Interface Processor and 7200 VXR Routers Provide High-Density SS7 Agrregation," Cisco Systems, Inc., pp. 1-5 (Copyright 1992-2002).
"Next-Generation SS7 Networks with the Cisco IP Transfer Point," Cisco Systems, Inc., pp. 1-14 (Copyright 1992-2002).

The attached email dated Oct. 20, 2001 and PowerPoint presentation dated Oct. 24, 2001 disclose an MSISDN-based auto-provisioning solution proposed by a customer of the assignee of the presend application.
"Agilent acceSS7 Business intelligence," Agilent Technologies, pp. 1-6 (Copyright 2001—Printed in the UK Nov. 30, 2001).
"Cisco IP Transfer Point (ITP) Network Management Product Presentation," Cisco Systems, Inc., pp. 1-20 (Copyright 2001).
"Networkers," Cisco Systems, Inc., pp. 1-60 (Copyright 2001).
"Cisco SS7 Signaling Offload," Cisco Systems, Inc., pp. 1-33 (Copyright 1992-2001).
Mealling, "The Naming Authority Pointer (NAPTR) DNS Resource Record," Network Working Group, RFC 2915 (Sep. 2000).
Rockhold, "Or," Wireless Review, p. 22, 23, 26, 28, 30, 32, (Aug. 15, 2000).
"Topsail Beach-SS7 Over IP-" Cisco Systems, Inc., pp. 1-16 (Copyright 1999).
ETSI, "Digital Cellular Telecommunications Systems (Phase 2++); Support of Mobile Number Portability (MNP); Technical Realisation; Stage 2," Global System for Mobile Communications, p. 1-71, (1998).
Smith, "Number Portability Pileup," Telephony, p. 22, 24, 26, (Jan. 6, 1997).
Jain et al., "Phone Number Portability for PCS Systems with ATM Backbones Using Distributed Dynamic Hashing," IEEE, vol. 15 (No. 1), p. 96-105, (Jan. 1997).
Heinmiller, "Generic Requirements for SCP Application and GTT Function for Number Portability," Illinois Number Portability Workshop, p. 1-50, (Sep. 4, 1996).
International Telecommunication Union, "Series Q: Switching and Signalling: Specifications of Signalling Systems No. 7—Signalling Connection Control Part," p. 11-16, (Jul. 1996).
Rice, "SS7 Networks in a PCS World," Telephony, pp. 138, 140 142, 144, 146, (Jun. 24, 1996).
Tekelec, "Eagle STP Planning Guide", Eagle Network Switching Division, (No. 3), p. i-vii, 1-64, A1-A2, B1-2, (May 1996).
Anonymous, "Generic Switching and Signaling Requirements for Number Portability," AT&T Network Systems, No. 1, p. 1-75, (Feb. 2, 1996).
ETSI, Digital Cellular Telecommunications System (Phase 2+); Milbe Application Part (MAP) Specification, Global System for Mobile Communications, pp. 112-114 (1996).
Jain, et al., "A Hashing Scheme for Phone Number Portability in PCS Systems with ATM Backbones," Bell Communications Research, p. 593-597, (1996).
Bishop, "Freeing the Network for Competition," Telecommunications, p. 75-80, (Apr. 1995).
Anonymous, "Zeichengabesysteme—Eine neue Generation für ISDN und intelligente Netze," Zeichengabesystem, Medien-Institut Bremen, p. iz-xi; 170-176, (Feb. 17, 1995).
Giordano et al., "PCS Number Portability," IEEE, p. 1146-1150, (Sep. 1994).
Bellcore, "Signaling Transfer Point (STP) Generic Requirements," Bell Communications Research, No. 1, p. ii-xxii, 4-84-J14, (Jun. 1994).
Telcordia Technologies, "CCS Network interface Specification (CCSNIS) Supporting SCCP and TCAP," Bell Communications Research, p. ii-xii, 1-1—C-22, (Mar. 1994).
Buckles, "Very High Capacity Signaling Trnsfer Point for Intelligent Network Servcies," DSC Communciations Corporation, p. 1308-1311, (1988).
Neustar, "ENUM: Driving Convergence in the Internet Age," pp. 1-5 (Publication Date Unknown).
"Diameter Overview," referenced from www.ulticom.com/html/products/signalware-diameter-reference-guide.asp (Publication date unknown).
"Chapter 1: Overview," SS7 Port Adapter Installation and Configuration, pp. 1-1-1-8 (Publication Date Unknown).
"Configuring ITP Basic Functionally," IP Transfer Point, Cisco IOS Release 12.2(4)MB12, pp. 31-50 (Publication Date Unknown).
"Configuring ITP Optional Features," IP Transfer Point, Cisco IOS Release 12.294)MB12, pp. 65-136 (Publication Date Unknown).

(56) References Cited

OTHER PUBLICATIONS

"Configuring M3UA and SUA SS7 Over IP Signaling Gateways," IP Transfer Point, Cisco IOS Release 12.2(4)MB13, pp. 51-66 (Publication Date Unknown).
"Configuring M3UA and SUA SS7 Over IP Signaling Gateways," IP Transfer Point, Cisco IOS Release 12.2(4)MB10, pp. 49-62 (Publication Date Unknown).
Non-Final Office Action for U.S. Appl. No. 13/044,510 (Sep. 20, 2016).

\* cited by examiner

SAMPLE E.164 FORMATS

| COUNTRY CODE | NATIONAL DESTINATION CODE (OPTIONAL) | SUBSCRIBER # |
|---|---|---|
| CC = 1~3 DIGITS | NATIONAL (SIGNIFICANT) NUMBER | |
| | MAX = 15 – CC DIGITS | |
| INTERNATIONAL PUBLIC TELECOMMUNICATION NUMBER FOR GEOGRAPHIC AREAS (MAX 15 DIGITS) | | |

| COUNTRY CODE | GLOBAL SUBSCRIBER # |
|---|---|
| CC = 1~3 DIGITS | MAXIMUM = 15 – CC DIGITS |
| INTERNATIONAL PUBLIC TELECOMMUNICATION NUMBER FOR GLOBAL SERVICE (MAX 15 DIGITS) | |

| COUNTRY CODE | IDENTIFICATION CODE | SUBSCRIBER # |
|---|---|---|
| CC = 1~3 DIGITS | X = 1~4 DIGITS | MAXIMUM = 15 – (CC + X) DIGITS |
| INTERNATIONAL PUBLIC TELECOMMUNICATION NUMBER FOR NETWORKS (MAX 15 DIGITS) | | |

| COUNTRY CODE | GROUP ID CODE | SUBSCRIBER # |
|---|---|---|
| CC = 3 DIGITS | GIC = 1 DIGIT | MAXIMUM = 11 DIGITS |
| INTERNATIONAL PUBLIC TELECOMMUNICATION NUMBER FOR GROUPS OF COUNTRIES (MAX 15 DIGITS) | | |

FIG. 8

SYSTEMS, METHODS, AND COMPUTER READABLE MEDIA FOR LOCATION-SENSITIVE CALLED-PARTY NUMBER TRANSLATION IN A TELECOMMUNICATIONS NETWORK

PRIORITY CLAIM

This application claims the benefit of U.S. Provisional Patent Application Ser. No. 61/117,538, filed Nov. 24, 2008; the disclosure of which is incorporated herein by reference in its entirety.

TECHNICAL FIELD

The subject matter described herein relates to providing a service in a telecommunications network. More particularly, the subject matter described herein relates to systems, methods, and computer readable media for location-sensitive number translation in a telecommunications network.

BACKGROUND

A toll-free number is a telephone number in which the cost of the call is charged to the called party rather than to the calling party. In countries that follow the North American Numbering Plan (NANP), telephone numbers are of the form NPA-NXX-YYYY, where NPA is the numbering plan area code, roughly corresponding to a particular geographical area, and NXX is the exchange, which identifies a physical switching facility, called a central office (CO). The remaining digits, YYYY, identify a line card within the CO. When a CO detects that a subscriber whom that CO serves is attempting to place a call to called party telephone number, the values of NPA and NXX of the called party number are used by a switch to determine how to route a call.

A toll-free number, however, may have an "8XX" area code (e.g., 800, 877, 866, etc.), that does not correspond to any geographical location of the called party, and thus cannot be used by itself to determine the destination of the call or how it should be routed. For this reason, switches in conventional telecommunications networks that provide toll free service must send a query to a toll-free database to determine the true destination of the toll-free called party. A query to a toll-free database is herein referred to as a "toll-free query." A toll-free query typically includes the toll-free number, and the response to the toll-free query typically includes the directory number to which the toll-free number is mapped. For example, Tekelec, Incorporated provides a toll-free number "1-800-TEKELEC" (1-800-835-3532) for sales inquiries. This toll-free number may be mapped to a local directory number for Tekelec corporate world headquarters in Morrisville, N.C., which is 919-460-5500. Thus, a toll-free query for 800-835-3532 would return the directory number 919-460-5500.

Businesses often use a toll-free number as the primary telephone number for callers to use, because the same toll-free number may be used by a caller regardless of the geographical location of the caller. The savings to the business from using the same toll-free number in advertisements around the country, continent, or world, on company business cards and letterhead, and so on, may outweigh the additional expense incurred by the business of paying for the calls. A toll-free number that is very easy for customers or potential customers to remember, as in the 1-800-TEKELEC example, above, may even increase that business organization's sales, help it achieve high name recognition, or provide some other tangible or intangible benefit.

However, business entities or organizations that have a large or dispersed physical presence in the form of branch offices, service centers, or restaurants in different geographic locations, for example, may desire that a call made to the organization be directed to whichever branch office is geographically closest to the calling party. A fictional take-out pizza restaurant chain having stores in multiple geographic locations, for example, may desire that calls to its toll-free number, e.g., 1-800-GO-PIZZA (1-800-467-4992), be routed to the pizza restaurant closest to the geographic location of the calling party. In order to do this, the toll-free query must provide location information for the calling party, and the toll-free database must be able to use this calling party location information to select the appropriate directory number.

The ability to consider the location of the calling party as part of the process of performing a number translation is herein referred to as calling-party-location-sensitive called party number translation, which may be abbreviated to "location-sensitive called party number translation", or simply "location-sensitive number translation", for short.

In conventional systems, however, calling party location information may be unavailable or indeterminate. For example, the toll-free query issued by a switch may include the toll-free called party number, but no calling party information. Even if the toll-free query includes calling party information, that calling party information may not indicate the geographic location of the calling party, such as where the calling party number is a mobile subscriber number, in which case the mobile subscriber may be calling from anywhere within the cellular network. Even if the toll-free query includes information that does give some indication of the location of the calling party, conventional toll-free databases may not support calling party information as an input parameter to a toll-free query. The same problems apply to other number translation services that are not location-sensitive.

Accordingly, in light of these disadvantages associated with conventional approaches to providing called-party number translation in a telecommunications network, there exists a need for improved systems and methods for providing location-sensitive called-party number translation in a telecommunications network.

SUMMARY

According to one aspect, the subject matter described herein includes a method for providing location-sensitive called-party number translation in a telecommunications network. The method includes, at a signaling node that includes at least one processor: receiving a first signaling message that includes a called party number; determining proximity information associated with the calling party; performing a location-sensitive called party number translation based on the proximity information associated with the calling party; and sending the first signaling message or a second signaling message, the sent message including the translated called party number.

According to another aspect, the subject matter described herein includes a system for providing location-sensitive called-party number translation in a telecommunications network. The system includes a signaling node for receiving a first signaling message that includes a called party number, and a proximity processing module, operatively associated with the signaling node, for determining proximity information associated with the calling party, performing a location-sensitive called party number translation based on the proximity information associated with the calling party, and sending the first signaling message or a second signaling message, the sent message including the translated called party number.

The subject matter described herein for location-sensitive number translation in a telecommunications network may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer control the computer to perform steps. Exemplary non-transitory, computer readable media suitable for implementing the subject matter described herein include disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which:

FIG. 8 illustrates some of the various allowed formats for E.164 numbers.

DETAILED DESCRIPTION

In accordance with the subject matter disclosed herein, systems, methods, and computer readable media are provided for location-sensitive called-party number translation in a telecommunications network.

Figure 1:
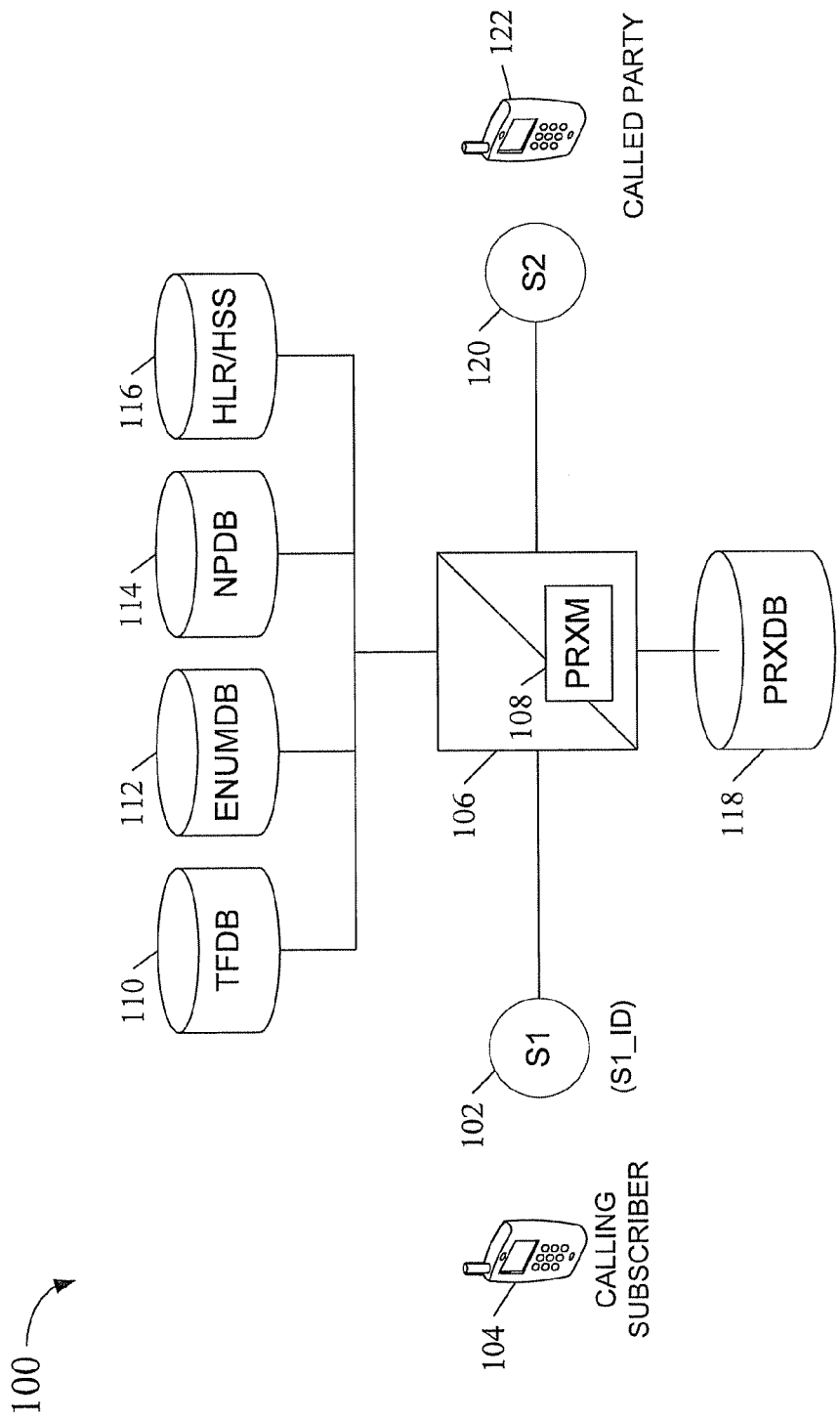
FIG. 1 is a block diagram illustrating an exemplary system for providing location-sensitive called-party number translation according to an embodiment of the subject matter described herein.

FIG. 1 is a block diagram illustrating an exemplary system for providing location-sensitive called-party number translation according to an embodiment of the subject matter described herein. In the embodiment illustrated in FIG. 1, a telecommunications network 100 includes a first switch (S1) 102, via which a subscriber 104 accesses network 100. When S1 102 is the switch that services a calling party, S1 102 may also be referred to as the "originating switch". In one embodiment, S1 102 may be a service switching point (SSP), such as an end office (EO) for servicing wireline subscribers. In alternative embodiments, S1 102 may be a mobile switching center (MSC) for servicing wireless or mobile subscribers, a tandem office (TO), a call session control function (CSCF), a softswitch (SS), or any other type of switch in a telecommunications network.

Network 100 includes a signaling node 106, such as a signaling message routing node, for routing signaling messages within network 100. In the embodiment illustrated in FIG. 1, signaling node 106 is a signal transfer point (STP). In alternative embodiments, signaling node 106 may be a signaling gateway (SGW), a softswitch (SS), a media gateway controller (MGC), a media gateway (MGW), or other entity for routing signaling messages within network 100.

In one embodiment, network 100 may include a proximity processing module (PRXM) 108 for determining proximity information associated with the calling party and using the proximity information to translate or map called party information. In the embodiment illustrated in FIG. 1, PRXM 108 may determine proximity information associated with either calling subscriber 104, originating switch 102, or both.

In one embodiment, the calling party proximity information may directly identify the geographic location of subscriber 104 or S1 102, and may include, for example, information such as the latitude and longitude, GPS location information, or other form of geographic coordinates of the subscriber or switch.

In another embodiment, the calling party proximity information may indirectly identify the geographic location of a subscriber or switch, and may include information identifying the switch, such as the switch address or switch ID. In a cellular network, the calling party proximity information may include, for example, the address or ID of the mobile switching center currently serving the subscriber, the cell ID, the geographic location of the switch, MSC, base station subsystem or other component of the cellular network, and so on.

In another embodiment, the calling party proximity information may be unrelated to the geographic location. For example, the calling party proximity information may relate to topological proximity, where the topological proximity of one node to another node may be defined by the number of intermediate nodes, or "hops", between the two nodes, path costs, or some other metric.

In the embodiment illustrated in FIG. 1, PRXM 108 is a component of signaling node 106, but in alternative embodiments, PRXM 108 may be located remotely from signaling node 106. In one example implementation, the functions of PRXM 108 may be performed in whole or in part by a service capabilities interaction manager function, such the TekSCIM® product, available from Tekelec of Morrisville, N.C. One implementation of a service capabilities interaction manager is described in commonly-assigned U.S. patent application Ser. No. 12/106,807, entitled "Systems, methods, and computer program products for providing service interaction and mediation in a communications network", filed on Apr. 21, 2008, the disclosure of which is incorporated by reference herein in its entirety. Another implementation of a service capabilities interaction manager is described in commonly-assigned U.S. patent application Ser. No. 12/106,869, entitled "Methods, systems, and computer program products for providing fault-tolerant service interaction and mediation function in a communications network", also filed on Apr. 21, 2008, the disclosure of which is incorporated by reference herein in its entirety.

In one embodiment, the location-sensitive number translation service provided by network 100 may be a location-sensitive toll-free service, in which a toll-free called party number is mapped to one of multiple directory numbers associated with that toll-free called party number based on whichever directory number is most proximate to the calling party. In such embodiments, network 100 may include a location-sensitive toll-free database (TFDB) 110 for mapping toll-free numbers, such as 1-8XX numbers in the United States, to a directory number. An example location-sensitive toll-free database is shown in Table 1, below. Each row in Table 1 represents an entry in TFDB 108, and each entry maps a toll-free number (TFN), shown in the left column, to a DN, shown in the right column, based on calling party proximity information (CGPI), shown in the middle column. A directory number may also be referred to as a "B-party number".

TABLE 1

Location-Sensitive Toll-Free Database (TFDB)

| row | TFN | CGPI | DN |
|---|---|---|---|
| 1 | 800-345-0393 | 919-XXX-XXXX | 919-469-2255 |
| 2 | 800-345-0393 | 212-XXX-XXXX | 212-458-6965 |
| . | . | . | . |
| . | . | . | . |
| N | 800-254-9990 | 919-682-XXXX | 919-682-5400 |
| N + 1 | 800-254-9990 | 919-683-XXXX | 919-683-1733 |
| N + 2 | 800-254-9990 | 919-684-XXXX | 919-684-6998 |
| . | . | . | . |
| . | . | . | . |

Referring to the example location-sensitive toll-free database illustrated in Table 1, above, rows 1 and 2 show that the first toll-free number (800) 345-0393 would be mapped to the directory number (919) 469-2255 if the calling party is calling from the (919) area code (North Carolina), but would be mapped to the directory number (212) 458-6965 if the calling party is calling from the (212) area code (New York). In this example, the first toll-free number is mapped to a directory number based on an area code; it can be said that the first toll-free number has a geographic resolution at the area code level. In contrast, rows N through N+3 show that the second toll-free number (800) 254-9990 is mapped to a local directory number at a finer geographic resolution, e.g., at the exchange level. In this manner, the level of geographic resolution can vary according to need. For example, a toll-free number may be mapped to one of only two choices, such as a west coast number and an east coast number. Likewise, a toll-free number may be mapped to as many geographic domains as the toll-free database may support.

In an alternative embodiment, the location-sensitive called party number translation service provided by network 100 may be a location-sensitive E.164 telephone number mapping (ENUM) service, in which an E.164-format called party number is mapped to one of multiple Internet protocol (IP) addresses associated with the E.164-format called party number based on whichever IP address is most proximate to the calling party. In such embodiments, network 100 may include an ENUM database (ENUMDB) 112 for mapping E.164 telephone numbers to IP addresses. An example ENUM database is shown in Table 2, below.

TABLE 2

Location-Sensitive ENUM Database (ENUMDB)

| row | E.164 ID | PI | URI |
|---|---|---|---|
| 1 | 018004445678 | GPS(A, B, C) | Serv1@Network.net |
| 2 | 018004445678 | GPS(D, E, F) | Serv2@Network.net |
| 3 | 018004445678 | GPS(G, H, I) | Serv3@Network.net |
| . | . | . | . |
| . | . | . | . |
| N | 019194695858 | Proximity ID (X) | Serv4@Network.net |
| N + 1 | 019194695858 | Proximity ID (Y) | Serv5@Network.net |
| N + 2 | 019194695858 | Proximity ID (Z) | Serv6@Network.net |
| . | . | . | . |
| . | . | . | . |

Each row in Table 2 represents an entry in ENUMDB 112, and each entry maps an E.164 subscriber ID (E.164 ID), shown in the left column, to a uniform resource identifier (URI), shown in the right column, based on proximity information (PI), shown in the middle column. The value of the E.164 ID column shown in Table 2, above could be in E.164 format (e.g., 8.7.6.5.4.4.4.0.0.8.1.0) or in directory number format (e.g., 018004445678). For simplicity, the E.164 IDs shown in Table 2 are in directory number format. In alternative embodiments, ENUMDB 112 may map E.164 numbers to IP addresses.

As shown in Table 2, the proximity information can take on various forms. For example, as shown in rows 1~3 of Table 2, above, the proximity information may be global positioning system (GPS) coordinates that define a position, such as a location on the surface of the earth, including height above or below the surface of the planet. Other positioning coordinate systems may also be used. Alternatively, as shown in rows N through N+2 of Table 2, above, the proximity information may be in the form of a proximity ID that identifies an object whose location is known or is readily determinable.

Where the proximity information is a location, in one embodiment, the proximity information stored in ENUMDB 112 may be position of the URI, in which case the query message to ENUMDB 112 may include the position of the calling party (or of the switch that is serving the calling party) along with the called party number. In this scenario, ENUM DB 112 may select records whose E.164 ID value matches the called party number, calculate a geometric distance between the calling party and the PI value for each selected record, and then select the record with the smallest calculated difference. The record thus selected includes the URI of the server that is geographically closest to the calling party. In this example, the proximity information stored in ENUM DB 112 refers to the location of the respective URI.

Where the proximity information is a location, in another embodiment, the proximity information stored in ENUMDB 112 may define an area served by the respective URI. In this scenario also, the query message to ENUMDB 112 may including the position of the calling party or originating switch. ENUMDB 112 may determine whether the calling party position falls within an area served by a URI, and if so, respond to the ENUM query with that URI. In this example, the proximity information stored in ENUM DB 112 refers to the allowable locations that the calling party may be in order for that calling party's call to be redirected to that particular URI.

Where the proximity information is a proximity ID, the proximity information stored in ENUMDB 112 may identify the switch from which the call originates, in which case the proximity ID may be the switch ID, the switch address, or the switch name. Thus, as shown in rows N through N+2 in Table 2, above, an ENUM query that includes a called party E.164 number 8.5.8.5.9.6.4.9.1.9.1.0, which corresponds to a directory number of 019194695858, will return different results depending on whether the calling party is calling from an MSC having an MSC_ID="X" or from an MSC having an MSC_ID="Y". In the former case, the URI returned will be "Serv4@Network.net", and in the latter case, the URI returned will be "Serv5@Network.net". Because switches are typically not mobile but fixed to a particular location, ENUMDB 112 may avoid the need to calculate distance between the calling party and the URI or determine whether the calling party is located within an area served by the URI.

There is a trade-off, however. In one approach, the PI field of ENUMDB 112 stores location information for the URI. In this scenario, ENUMDB 112 would calculate a distance from the calling party location to each URI and then select the closest URI. In such embodiments, ENUMDB 112 need only store, for each called party number, a record for each possible destination URI. For example, if the called party number can only be routed to one of two destination URIs, then ENUMDB 112 may need only store two records for that called party number.

Using a second approach, the PI field of ENUMDB 112 may contain a switch ID. In this scenario, ENUMDB 112 may avoid the need to calculate distance, but it may instead require that ENUMDB 112 include a record for each potential originating switch ID. In a network with only two destination URIs but dozens of potential originating switches, this second approach may require that ENUMDB 112 contain dozens of records, rather than just the two records required under the first approach.

In one embodiment, network 100 may support number portability. In the embodiment illustrated in FIG. 1, network 100 may include a number portability database (NPDB) 114, which maps a ported subscriber's directory number (DN) to the routing number (RN) of the recipient switch. Alternatively, PRXM 108 may use NPDB 114 to determine calling party proximity information, as will be illustrated in FIG. 5 and described below.

In one embodiment, network 100 may support mobile subscribers. In the embodiment illustrated in FIG. 1, network 100 may include a home location register and/or home subscriber server (HLR/HSS) 116 for maintaining information for each mobile subscriber, including information about the current location of a roaming mobile subscriber. Alternatively, PRXM 108 may use HLR 116 to determine calling party proximity information, as will be illustrated in FIG. 7B and described below. Other databases may be used, as well, including location servers, presence servers, and the like.

In one embodiment, network 100 may include a proximity information database (PRXDB) 118 for mapping proximity information to geographic location, such as GPS coordinates. An example proximity information database is shown in Table 3, below. Each row of Table 3 represents an entry in PRXDB 118, and each entry maps a proximity ID, shown in the left column, to GPS coordinates, shown in the right column. The proximity information may be a switch ID or switch address, or other proximity information associated with the calling party.

TABLE 3

Proximity Information Database (PRXDB)

| row | Proximity Information | Location Information |
|---|---|---|
| 1 | PROXY_ID1 | GPS(J, K, L) |
| 2 | MME_ID1 | GPS(M, N, O) |
| 3 | MSC_ID1 | GPS(P, Q, R) |
| . | . | . |
| . | . | . |
| . | . | . |

Referring to Table 3, if PRXM 108 receives a number translation request, such as a toll-free query or an ENUM query, from a switch identified as "MSC_ID1", PRXM 108 may use PRXDB 118 to determine that switch MSC_ID1 is located at GPS coordinates (P,Q,R). PRXM 108 may then include those GPS coordinates in the query message and forward the modified number translation request to the appropriate database (e.g., TFDB 110, ENUMDB 112, NPDB 114, HLR/HSS 116.) Like PRXM 108, above, PRXDM 116 may be internal or external to signaling node 106.

In the embodiment illustrated in FIG. 1, network 100 includes a second switch (S2) 120, which serves toll-free called party 122. When a switch, such as S2 118, services a called party, such as called party 122, that switch may also be referred to as the "terminating switch". Like S1 102, S2 120 may be an SSP, an EO, an MSC, a TO, a CSCF, an SS, or other type of switching point.

Figure 2A:
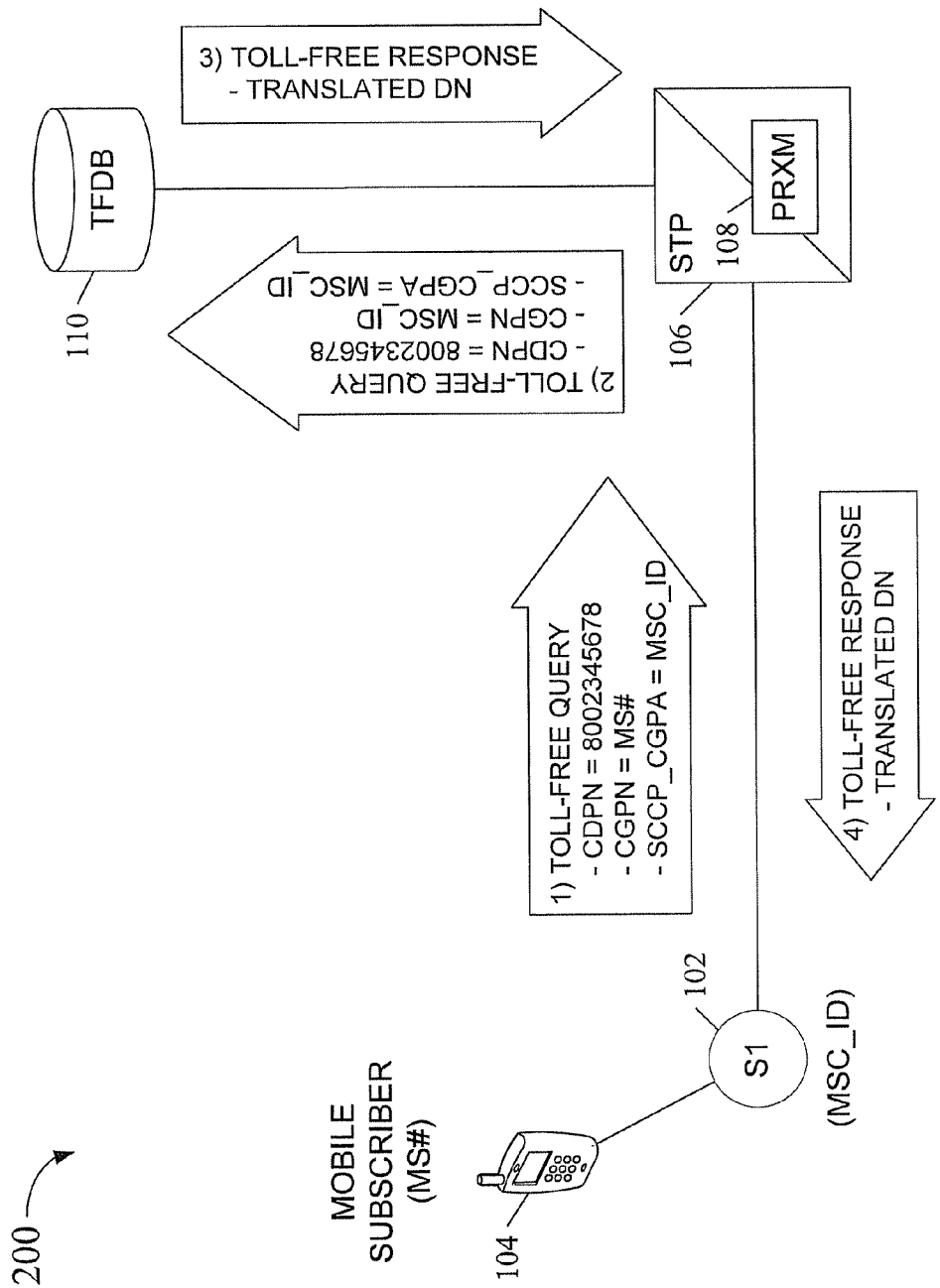
FIG. 2A is a block diagram illustrating signaling messages communicated within an exemplary system for providing location-sensitive called-party number translation according to another embodiment of the subject matter described herein.

FIG. 2A is a block diagram illustrating signaling messages communicated within an exemplary system for providing location-sensitive called-party number translation according to another embodiment of the subject matter described herein. FIG. 2A illustrates an embodiment of a location-sensitive toll-free service, in which the location of the calling party is considered while performing the toll-free lookup of the called party. In the embodiment illustrated in FIG. 2A, a telecommunications network 200 that supports mobile subscribers includes a mobile switching center, S1 102, which currently serves a mobile subscriber 104 who is making a call to a toll-free called party number 800-234-5678. Mobile subscriber 104 has a mobile phone number "MS#", and S1 102 has a switch identity "MSC_ID". S1 102 sends a toll-free query (FIG. 2A, message 1), such as a transactions capabilities part (TCAP) message, that includes parameters or fields for the called party number (CDPN) and the calling party number (CGPN). This message also includes the calling party address used by the SCCP protocol (SCCP_CGPA), which is the address of the switch that issued the message, MSC_ID. In alternative embodiments, the message may be an advanced intelligent network (AIN), wireless intelligent network (WIN), or customized applications for mobile networks enhanced logic (CAMEL) query. This message is received by signaling node 106, which in the embodiment illustrated in FIG. 2A is an STP, and is processed by the proximity processing module PRXM 108.

Since the call is from a mobile subscriber 104, the calling party identifier (i.e., the mobile subscriber's cell phone number, MS#) does not convey any proximity or location information. PRXM 108 therefore determines proximity information associated with the calling party. In the embodiment illustrated in FIG. 2A, originating switch S1 102 is associated with a geographic location, and thus PRXM 108 may use information identifying S1 102 as the proximity information associated with the calling party. In the embodiment illustrated in FIG. 2A, the proximity information associated with the calling party may be the switch ID, which is stored in the calling party address information field contained in the SCCP portion of a intelligent network (IN) query message. Alternatively, the proximity information associated with the calling party may include an SS7 point code address contained within the message transfer part (MTP) layer of an SS7 or SIGTRAN-based message.

PRXM 108 may then either modify the original query message or generate a new query message and send this message (FIG. 2A, message 2) to TFDB 110. In this message, the value that was stored in the original calling party number field CGPN has been changed from the mobile subscriber number, MS#, to the switch ID of the originating switch S1 102, MSC_ID. TFDB 110 receives the modified message and performs a toll-free query on the called party number, using the calling party proximity information stored in the CGPN field, and returns a directory number (FIG. 2A, message 3), hereinafter referred to as the translated DN. PRXM 108 then forwards the translated DN to S1 102 (FIG. 2A, message 4).

In an alternative embodiment, the toll-free query (FIG. 2A, message 1) that is sent from S1 102 may not include any calling party number information, i.e., the message may not include a CGPN field, or the CGPN field may be blank. In such embodiments, PRXM 108 may create a CGPN field or parameter and populate that field with the proximity information associated with the calling party as described above. Such an embodiment would look very much like the embodiment illustrated in FIG. 2A, except that the first message (FIG. 2A, message 1), would not contain a CGPN field or the CGPN field would be blank.

Figure 2B:
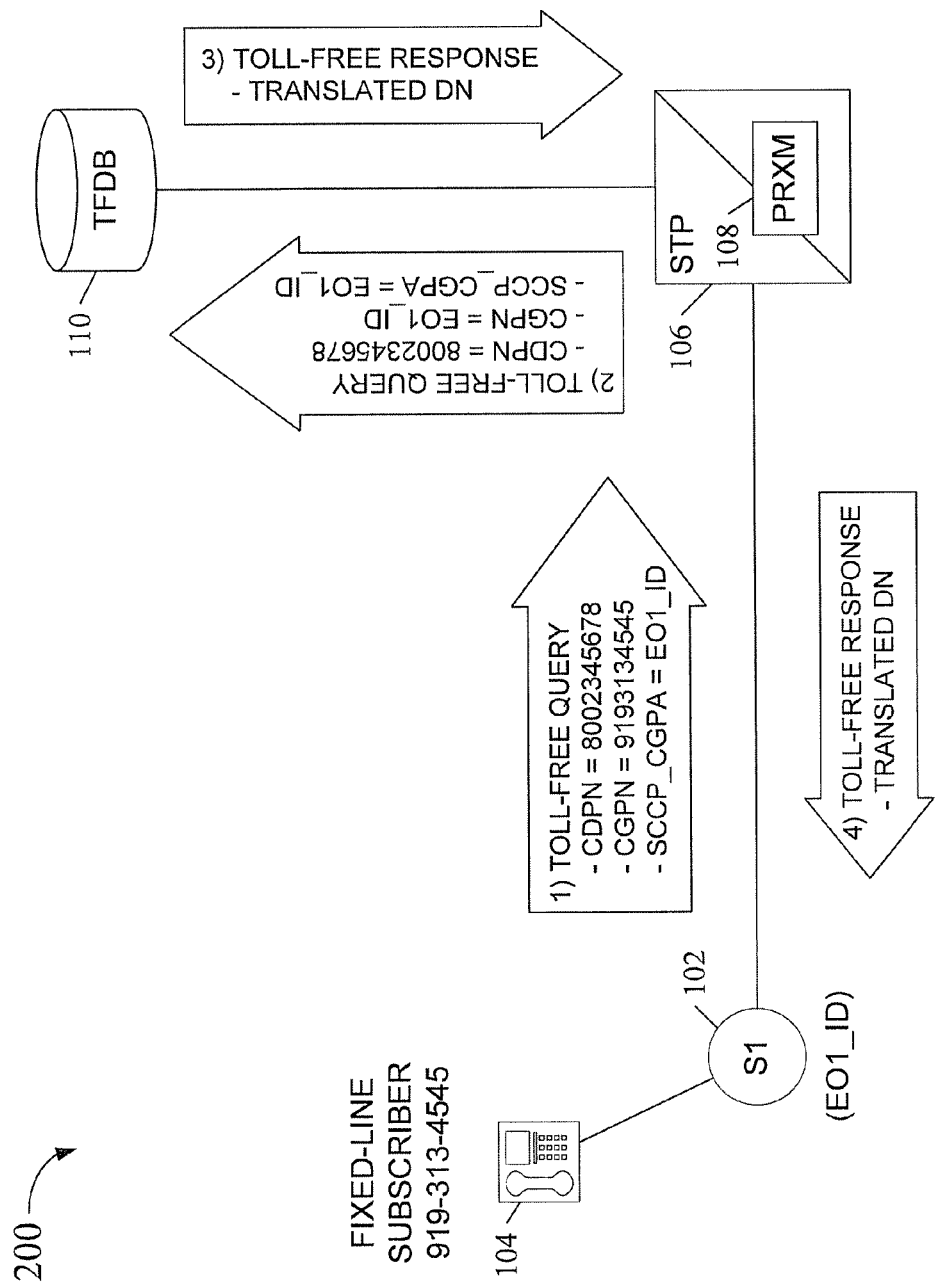
FIG. 2B is a block diagram illustrating signaling messages communicated within an exemplary system for providing location-sensitive called-party number translation according to another embodiment of the subject matter described herein.

FIG. 2B is a block diagram illustrating signaling messages communicated within an exemplary system for providing location-sensitive called-party number translation according to another embodiment of the subject matter described herein. In the embodiment illustrated in FIG. 2B, S1 102 is a central office or end office that serves a fixed line subscriber 104 having a telephone number, 919-313-4545. In response to fixed line subscriber 104 placing a call to toll-free number 800-234-5678, S1 102 issues a toll-free query (FIG. 2B, message 1) to TFDB 110, the toll-free query including the called party number, the calling party number, and the calling party address information in the SCCP portion of the message. In the embodiment illustrated in FIG. 2B, the calling party address is the switch ID for the end office, EO1_ID. Signaling node 106 intercepts the toll-free query, and PRXM 108 modifies the query by replacing the calling party number with the end office ID, EO1_ID, and forwards the modified query to TFDB 110 (FIG. 2B, message 2). TFDB 110 performs a toll-free query using the proximity information for the calling party, end office identifier EO1_ID, to determine the directory number that is most proximate to the calling party. TFDB 110 returns the selected DN (FIG. 2B, message 3), which signaling node 106 forwards to S1 102 (FIG. 2B, message 4).

Figure 3:
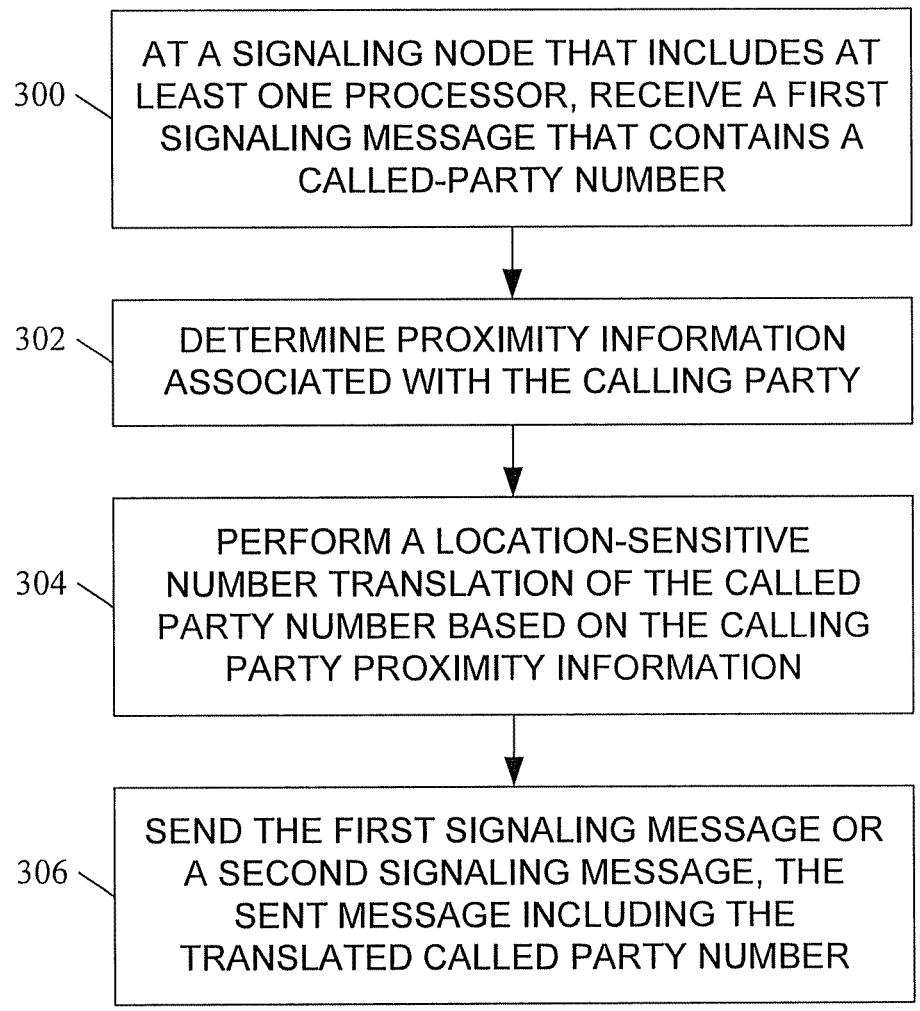
FIG. 3 is a flow chart illustrating an exemplary process for providing called-party number translation in a telecommunications network according to an embodiment of the subject matter described herein.

FIG. 3 is a flow chart illustrating an exemplary process for providing location-sensitive called-party number translation in a telecommunications network according to an embodiment of the subject matter described herein.

At block 300, a first signaling message, containing a called party number, is received at a signaling node that includes at least one processor. The first signaling message may include, but is not limited to, a call setup message, a toll-free query, and an ENUM query. For example, in one embodiment, S1 102 may send a call setup message, such as an ISUP initial address message (IAM), an ISUP subsequent address message (SAM), a bearer-independent call control (BICC) message, or a SIP INVITE message, that includes the called party number.

In another embodiment, calling subscriber 104 may be a mobile subscriber and S1 102 may be a mobile switching center (MSC), which may issue a mobility management message, such as a mobile application part (MAP) send routing information (SRI) message, a MAP send routing information for short message (SRI_SM) message, an anytime interrogation (ATI) message, or an ANSI-41 location request (LOCREQ) message, that includes the called party number.

In yet another embodiment, calling subscriber 104 may be a wireline subscriber and S1 102 may be an end office (EO), a central office (CO), a service switching point (SSP), or similar entity, which may issue a call setup message that includes the toll-free called party number. In another embodiment, S1 102 may issue a number portability (NP) query that includes the called party number.

In yet another embodiment, calling subscriber 104 may be a user agent client (UAC) in a session initiation protocol (SIP) network and S1 102 may be a SIP router, SIP application server (SAS), media gateway (MOW), or similar entity, which may issue SIP INVITE message, a number translation request, such as an ENUM query, or other message that includes the called party number.

At block 302, proximity information associated with the calling party is determined. For example, PRXM 108 may extract information contained within the received message, such as: the name, number, address or other identifier of the calling party; GPS or other location information for the calling party; the name, number, address, or other identifier of the switch or node from which the first signaling message was sent; GPS or other location information for the switch or node from which the first signaling message was sent; or other information that is associated with the calling party.

In one embodiment, the proximity information so extracted may be used directly. For example, in FIG. 2A, the switch ID, "MSC_ID" is the proximity information that was included in the toll-free query (FIG. 2A, message 1); that switch ID is included in the toll-free query sent to TFDB 110 (FIG. 2A, message 2). In an alternative embodiment, the proximity information extracted from the received message may be mapped to another kind or form of proximity information. For example, PRXM 108 may use proximity database 118, which may operate as an origination point code (OPC) to routing number (RN) mapping database to translate the OPC of the received message to a routing number, which is then included in the toll-free query. An example of an OPC-to-RN database is shown in Table 4, below. Each row of Table 4 represents an entry in PRXDB 118, and each entry maps an SS7 origination point code (OPC), shown in the left column, to a routing number (RN), shown in the right column.

TABLE 4

OPC-to-RN database

| row | Origination Point Code | Routing Number |
|-----|------------------------|----------------|
| 1   | 1-2-1                  | 9194690000     |
| 2   | 2-4-3                  | 2124580000     |
| .   | .                      | .              |
| .   | .                      | .              |
| .   | .                      | .              |

In another embodiment, the proximity information may come from sources other than data included in the received first signaling message. For example, if a signaling node has multiple ports, each port connecting to entities in different locations, the port number which received the message may indicate a geographic or topological proximity that may be associated with the calling party.

At block 304, a location-sensitive called party number translation is performed based on the calling party proximity information. For example, PRXM 108 may: issue a toll-free query to TFDB 108; issue a number portability query to NPDB 110; issue a mobility management query to HRL 112; issue an ENUM query to ENUM database 122; or some combination of the above.

At block 306, the first signaling message or a second signaling message is sent, the sent message including the translated called party number. For example, the original message (i.e., the first signaling message) may be modified and sent forward to the intended destination, or a new message (i.e., the second signaling message) may be generated and sent forward to the intended destination. Alternatively, a new signaling message (i.e., the second signaling message) may be generated and sent back to the sender of the first message, e.g., the second message may be a response to the first message query.

Figure 4:
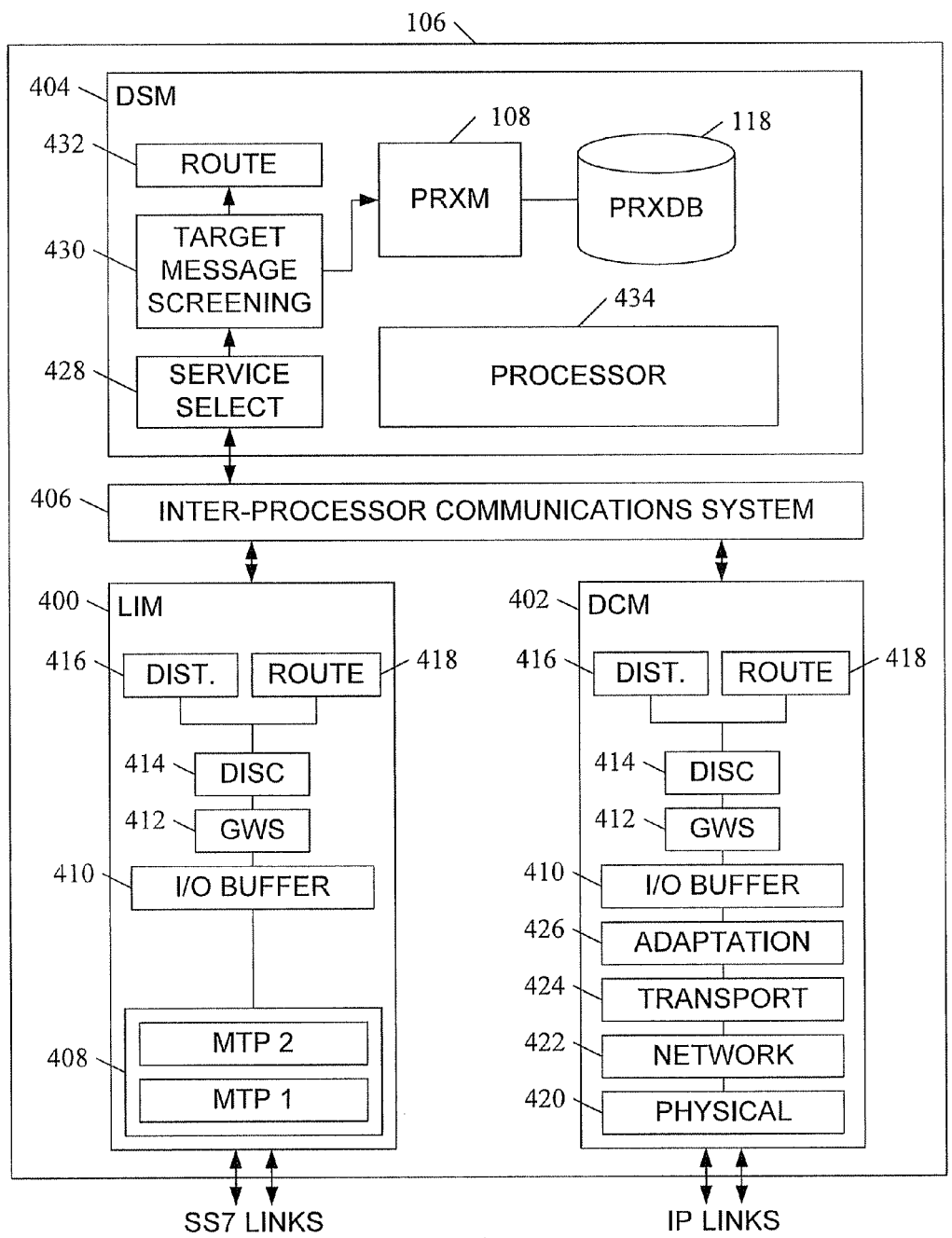
FIG. 4 is a block diagram illustrating an exemplary signaling message routing node for providing toll-free service in a telecommunications network according to another embodiment of the subject matter described herein.

FIG. 4 is a block diagram illustrating an exemplary signaling message routing node 106 for providing location-sensitive called party number translation service in a telecommunications network according to another embodiment of the subject matter described herein. In one embodiment, signaling node 106 may be a signal transfer point (STP). In the embodiment illustrated in FIG. 4, signaling node 106 includes a link interface module (LIM) 400, a data communications module (DCM) 402, and a database services module (DSM) 404. Each module 400, 402, and 404 may include a printed circuit board having one or more processors. For example, each module may include an application processor for performing application level processing of signaling messages, and a communications processor for controlling inter-processor communications via inter-processor communications system (IPC) 406. IPC 406 may be any suitable mechanism for providing message communication between processing modules 400, 402, and 404. For example, IPC 406 may be a bus, an Ethernet LAN, or any other suitable mechanism for providing communications between processors.

LIM 400 includes various functions for sending and receiving signaling messages over SS7 signaling links. In the illustrated example, LIM 400 includes a message transfer part (MTP) level 1 and 2 function 408, an I/O buffer 410, a gateway screening (GWS) function 412, a discrimination function 414, a distribution function 416, and a routing function 418. MTP level 1 and 2 function 408 performs MTP level 1 and 2 functions, such as error detection, error correction, and sequencing of signaling messages. I/O buffer 410 stores inbound signaling messages before the messages are processed by higher layers. I/O buffer 410 also stores outbound signaling messages waiting to be transmitted over a signaling link by MTP level 1 and 2 function 408. Gateway screening function 412 screens inbound signaling messages based on destination point code and, optionally, based on originating point code to determine whether the messages should be allowed into the network. Discrimination function 414 analyzes the destination point code in each received signaling message to determine whether the signaling message should be processed by an internal processing module within node 106 or whether the message should be routed over an outbound signaling link. Discrimination function 414 forwards messages that are to be internally processed to distribution function 416. Discrimination function 414 forwards messages that are to be routed over an outbound signaling link to routing function 418. Distribution function 416 distributes messages that are identified as requiring internal processing to the appropriate internal processing module. For example, distribution function 416 may forward SCCP messages to database services module 404 for SCCP processing. Routing function 418 routes signaling messages that are addressed to point codes other than the point code of node 106. For example, routing function 418 may forward messages to another link interface module (not shown in FIG. 4) or to data communications module 402 for transmission over an outbound signaling link.

DCM 402 includes various functions for sending and receiving signaling messages over IP signaling links. Example signaling messages include SS7 over IP messages, session initiation protocol (SIP) messages, and others. In FIG. 4, these functions include a physical layer function 420, a network layer function 422, a transport layer function 424, an adaptation layer function 426, and SS7 MTP functions 410, 412, 414, 416, and 418 as described with regard to LIM 400. Physical layer function 420 may be any suitable physical layer function for sending and receiving frames that encapsulate network layer packets. In one exemplary implementation, physical layer function 420 may be implemented using an Ethernet transceiver. Network layer function 422 may be implemented using Internet protocol, such as IPv4 or IPv6. Transport layer function 424 may be implemented using any suitable transport layer protocol. Examples of transport protocols suitable for use with embodiments of the subject matter described herein include user datagram protocol (UDP), transmission control protocol (TCP), and stream control transmission protocol (SCTP). Adaptation layer function 426 may be implemented using any suitable adaptation layer, including adaption layers for sending SS7 messages over IP. Examples of adaptation layers suitable for use with the subject matter described herein include M3UA, M2PA, SUA, and TALI, as described in the correspondingly named IETF Internet drafts and RFCs. The remaining functions of DCM 402 are the same as those described with regard to LIM 400. Hence, a description thereof will not be repeated herein.

DSM 404 includes various functions and databases for processing signaling messages. In the illustrated example, DSM 404 includes a service selection function 428, a target message screening function 430, and a routing function 432. Database services module 404 also includes proximity processing module (PRXM) 108 for determining proximity information associated with a calling party. Service selection function 428 receives messages from interface processors and determines the type of service required for each message. For example, service selection function 428 may determine whether further screening of messages is required or whether the messages are simply to be global title translated and routed. For CAP or INAP messages, service selection function 428 may forward the messages to target message screening function 430. Target message screening function 430 screens CAP or INAP messages received by DSM 404 to identify targeted message types. According to the subject matter described herein, target message screening function 430 may identify call setup messages, such as ISUP IAM or SAM, as a targeted message type requiring further processing. For call setup messages, targeted message screening function 430 may communicate with PRXM 108 to determine proximity information for a calling party. For example, PRXM 108 may process signaling messages associated with toll-free calls and determine the called party directory number associated with the toll-free called party that is most proximate geographically or topologically to the calling party.

Signaling node 106 may include one or more processors. For example, in the embodiment illustrated in FIG. 4, DSM 404 includes a processor 434. In alternative embodiments, each module within signaling node 106, such as LIM 400, DCM 402, DSM 404, IPC 406, etc., may include one or more processors suitably programmed to perform some or all of the functions associated with the particular module, such as discrimination function 414, target message screening function 430, inter-processor communications 406, and so on.

In one embodiment, PRXM 108 may receive a mobility management message related to a toll-free call. For example, PRXM 108 may receive an SRI message including a toll-free number. In response, PRXM 108 may identify the SRI message as one that requires toll-free processing and take appropriate action. For example, PRXM 108 may generate a TF query and send the generated query to TFDB 108 via LIM 400 or DCM 402 as appropriate. PRXM 108 may subsequently receive a response to the TF query, and perform additional queries to other databases as needed.

In the embodiment illustrated in FIG. 1, databases TFDB 108, NPDB 110, and HLR 112 are external to signaling node 106, which issues queries and receives responses via network 100. In the embodiment of signaling node 106 illustrated in FIG. 4, signaling node 106 may include a local proximity information database 118. In one embodiment, DSM 404 may include an internal toll-free database, an internal number portability database, an internal HLR database, etc., or some combination of the above. It will be obvious to one of skill in the art that the subject matter described herein contemplates both internal and external, local and remote databases, in any combination.

As used herein, the term "database" refers to a database, a table, a data structure, a portion of memory or data storage, or other means to store and retrieve data, in particular two pieces of data in a key/value relationship. Thus, the term "database query" refers to not only a database query, but also a table lookup or access to a data structure, for example. A database query, such as may be used to determine a directory number associated with a toll-free called party number or to determine routing information associated with a directory number, could be performed using one or more protocols, including but not limited to a TCAP or MAP protocol, an Internet protocol (IP), a signaling connection and control part (SCCP) user adaptation (SUA) protocol, a session initiation protocol (SIP), or other protocols usable to perform a data query.

Figure 5:
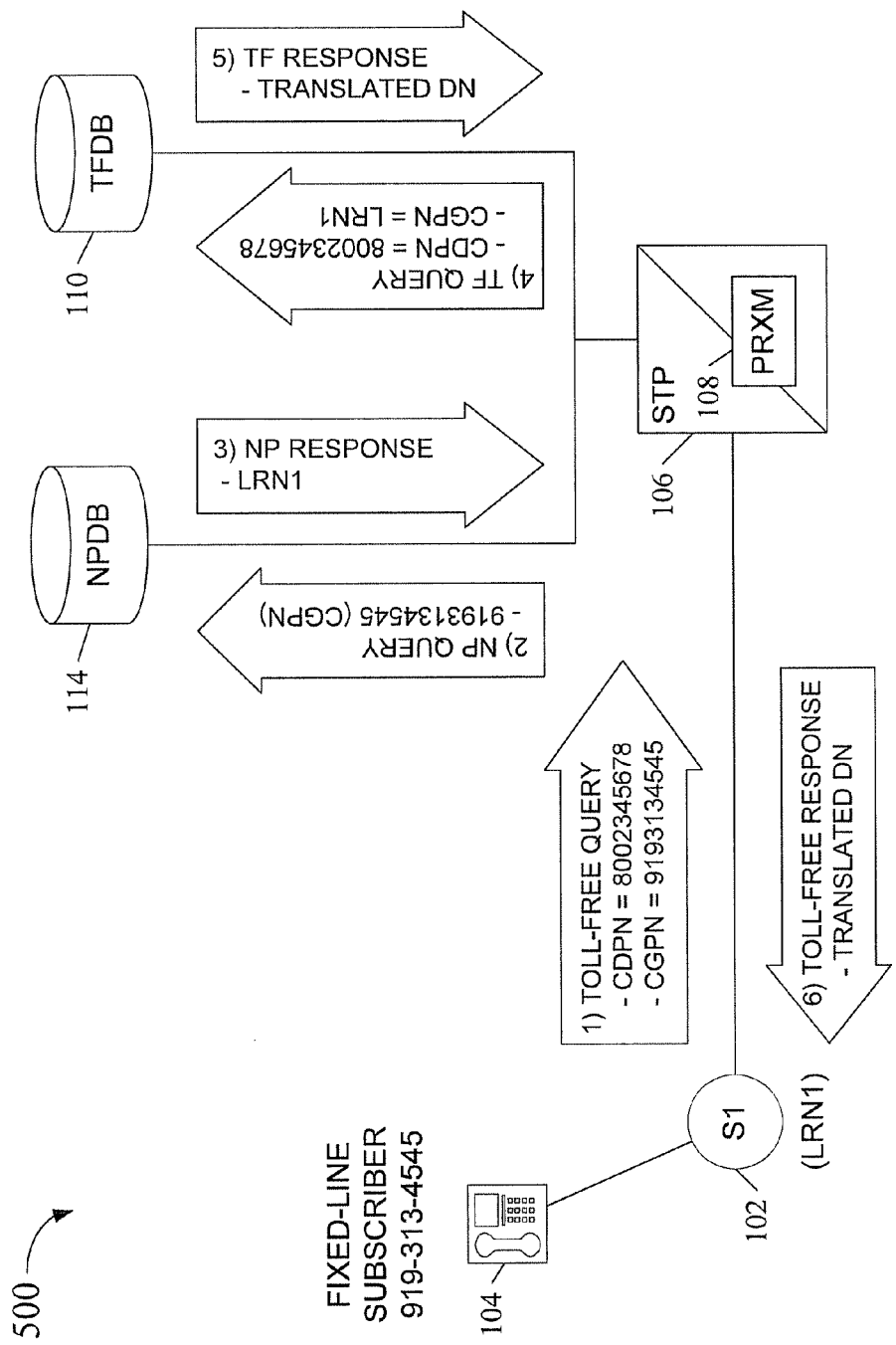
FIG. 5 is a block diagram illustrating signaling messages communicated within an exemplary system for providing location-sensitive called-party number translation according to another embodiment of the subject matter described herein, in which a number portability query is used to determine the proximity information associated with the calling party.

FIG. 5 is a block diagram illustrating signaling messages communicated within an exemplary system for providing location-sensitive called-party number translation according to another embodiment of the subject matter described herein, in which a number portability query is used to determine the proximity information associated with the calling party. In the embodiment illustrated in FIG. 5, network 500 includes a central office, S1 102, that services a fixed-line subscriber 104 having a directory number 919-313-4545, who is attempting to call toll-free number 800-234-5678. S1 102 is associated with a local routing number, "LRN1". S1 102 determines that subscriber 102 is calling a toll-free number, and issues a toll-free query (FIG. 5, message 1) to TFDB 110. Signaling node 106, such as an STP, intercepts the toll-free query and passes it to proximity processing module PRXM 108. In the embodiment illustrated in FIG. 5, PRXM 108 extracts the calling party number, e.g., 9193134545, and uses it in a number portability (NP) query (FIG. 5, message 2) to number portability database NPDB 114. Rather than using the NP query to determine a routing number for the called party, PRXM 108 uses the NP query to determine a routing number for the calling party, which is returned by NPDB 114 (FIG. 5, message 3) to PRXM 108. An example of an NP database is shown in Table 5, below. Each row of Table 5 represents an entry in NPDB 114, and each entry maps an directory number or range of directory numbers, shown in the left column, to a routing number (RN), shown in the right column. The routing number may also be a mobile switch routing number (MSRN), local routing number (LRN), or similar.

TABLE 5

Number Portability Database (NPDB)

| row | DN Range | Routing Number |
|---|---|---|
| 1 | 9190000000~9199999999 | 3365550000 |
| 2 | 2120000000~2129999999 | 3365550001 |
| . | . | . |
| . | . | . |
| . | . | . |

Since subscriber 104 is a fixed line subscriber who is served by central office S1 102, NPDB 114 returns the local routing number associated with S1 102, "LRN1". The routing number LRN1 is the proximity information associated with the calling party, which PRXM 108 will use in a query to TFDB 110 (FIG. 5, message 4). In one embodiment, the routing number may be appended or prepended to the calling party number in the TF query. Alternatively, the calling party number may be replaced by the routing number in the TF query. TFDB 110 sends to PRXM 108 the translated directory number DN (FIG. 5, message 5) that is most proximate to calling party 104. Finally, signaling node 106 sends a toll-free response (FIG. 5, message 6) that includes the translated DN associated with the called party.

Figure 6A:
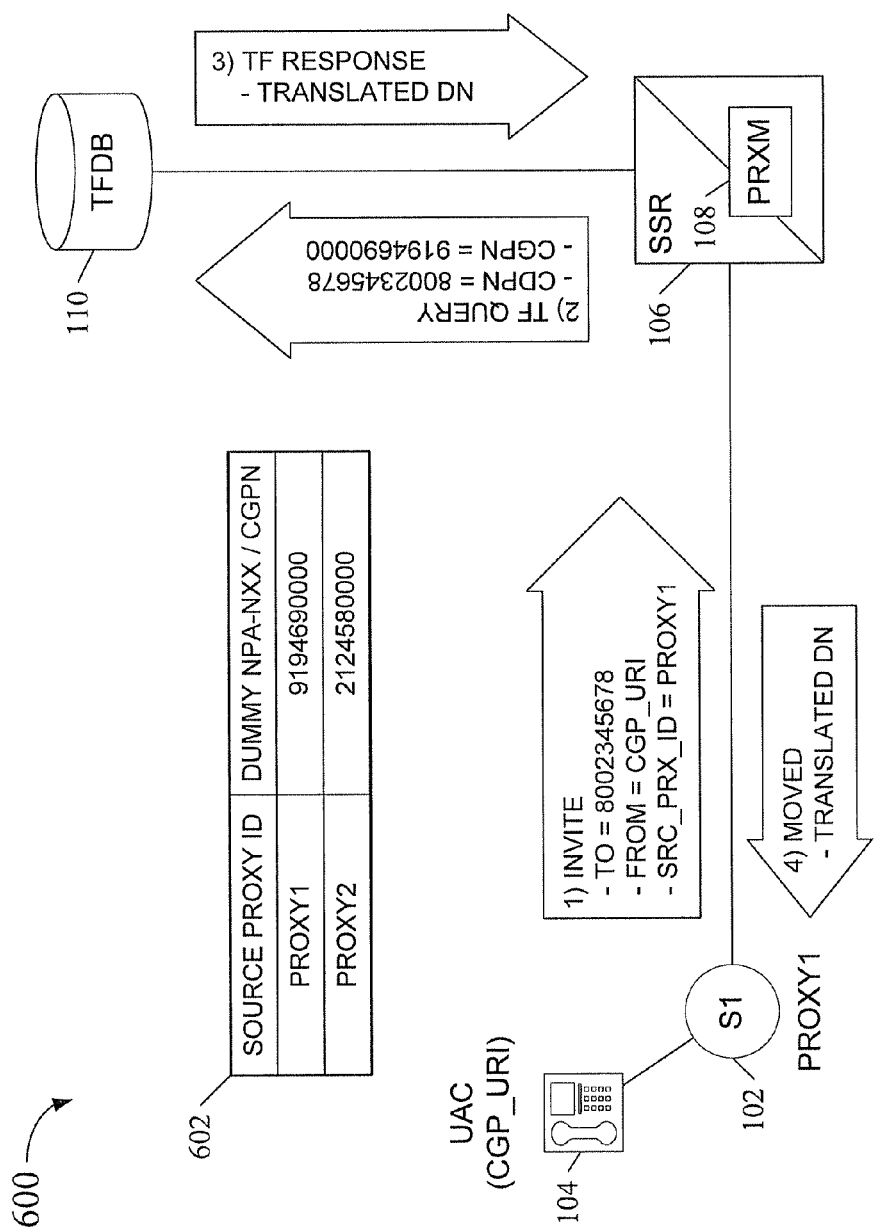
FIG. 6A is a block diagram illustrating signaling messages communicated within an exemplary system for providing location-sensitive called-party number translation according to another embodiment of the subject matter described herein.

FIG. 6A is a block diagram illustrating signaling messages communicated within an exemplary system for providing location-sensitive called-party number translation according to another embodiment of the subject matter described herein. In the embodiment illustrated in FIG. 6A, a telecommunications network 600 that supports the session initiation protocol (SIP) includes a SIP proxy server S1 102 that is identified by the source proxy ID "PROXY1". Calling party subscriber 104, which may be a UAC or other SIP-compatible device, may issue a call setup message, such as a SIP INVITE message, to a toll-free number, such as 800-234-5678. In the embodiment illustrated in FIG. 6A, the SIP INVITE message is forwarded through S1 102 and is received or intercepted by signaling node 106, which may be a SIP server/router (SSR). In the embodiment illustrated in FIG. 6A, the SIP INVITE message (FIG. 6A, message 1) includes a TO field, identifying the destination of the message, 800-234-5678, a FROM field, identifying the URI of the message source, "CGP_URI", and a SRC_PRX_ID field, which identifies the source proxy ID, "PROXY1".

In the embodiment illustrated in FIG. 6A, the source proxy ID is the proximity information that is associated with the calling party, and PRXM 108 includes an intermediate database 602 which maps source proxy ID to a dummy calling party number, which can then be used in a TF query to TFDB 110. This mapping may implement a SIP redirect function, which maps a SIP proxy or proxy call session control function (P-CSCF) identifier or address to a dummy NPA-NXX or CGPN that is representative of a geographic area or region that is served by the SIP proxy/P-CSCF. Referring to intermediate database 602, the source proxy ID for S1 102, "PROXY1", is mapped to a dummy calling party number of "919-469-0000", which PRXM 108 uses in a TF query (FIG. 6A, message 2) to location-sensitive TFDB 110. The TF query includes the called party information, 800-234-5678, and at least some of the proximity information associated with the calling party, such as dummy CPGN 919-469-0000. Location-sensitive TFDB 110 uses both pieces of information to determine the DN associated with the toll-free called party number that is most proximate to calling subscriber 104. Location-sensitive TFDB 110 then returns the selected DN (FIG. 6A, message 3) to PRXM 108.

PRXM 108 then uses this information to respond to the original SIP INVITE (FIG. 6A, message 1) with a SIP 3XX MOVED message (FIG. 6A, message 4), which includes destination information, i.e., the translated DN, which either S1 102 or calling subscriber 104 may used to restart the call to the translated DN address.

In one embodiment, intermediate database 602 may map other identifiers, such as client IP addresses, to a temporary DN. Client IP addresses, which may be correlated with a smaller geographic region than a proxy, may be extracted from the bottom-most Via header field and/or he Contact header field of the INVITE message (FIG. 6A, message 1). Other information that may be used as keys into intermediate database 602 include various access-information parameters from the P-Access-Network-Info header field, such as the Cell ID, which may be tightly correlated to a physical location. These parameters are described in more detail in section 4.4 of IETF RFC 3455, available on the world wide web at http://www.ietf.org/rfc/rfc3455.txt, and in section 7.2A.4 of the 3GPP technical specification TS 24.229, at http://www.3gpp.org/ftp/Specs/archive/24_series/24.229/24229-851.zip, both of which are herein incorporated by reference in their entireties.

Figure 6B:
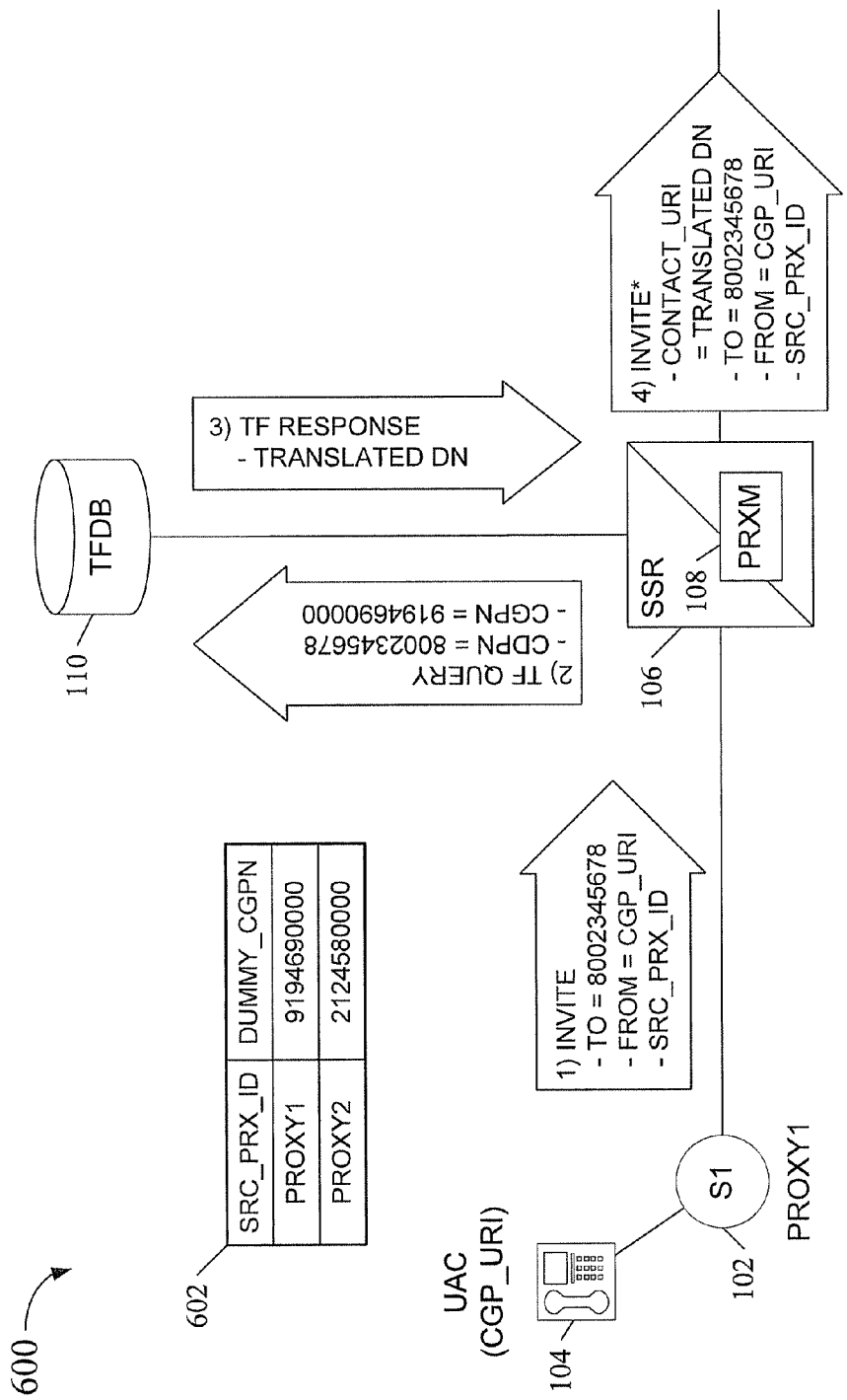
FIG. 6B is a block diagram illustrating signaling messages communicated within an exemplary system for providing location-sensitive called-party number translation according to another embodiment of the subject matter described herein.

FIG. 6B is a block diagram illustrating signaling messages communicated within an exemplary system for providing location-sensitive called-party number translation according to another embodiment of the subject matter described herein. In the embodiment illustrated in FIG. 6B, the first three messages, (FIG. 6B, message 1, 2, and 3) are essentially the same as the first three messages of FIG. 6A, and therefore their descriptions will not be repeated herein. However, in the embodiment illustrated in FIG. 6B, PRXM 108 sends a second signaling message (FIG. 6B, message 4) forward, using the translated DN supplied by TFDB 110 as the contact URI, instead of sending the SIP MOVED message back to S1 102, as was done in FIG. 6A.

Figure 6C:
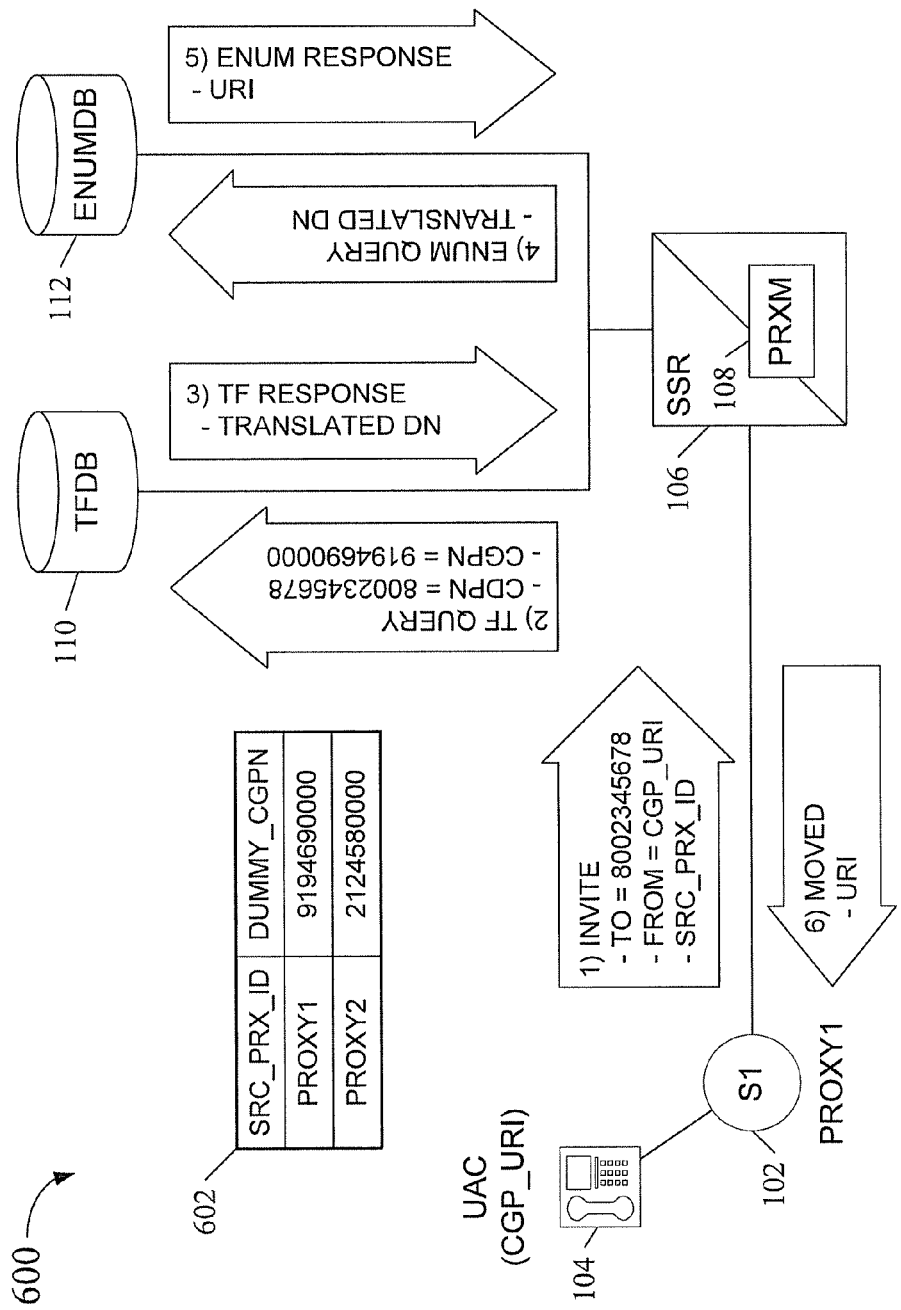
FIG. 6C is a block diagram illustrating signaling messages communicated within an exemplary system for providing location-sensitive called-party number translation according to another embodiment of the subject matter described herein.

FIG. 6C is a block diagram illustrating signaling messages communicated within an exemplary system for providing location-sensitive called-party number translation according to another embodiment of the subject matter described herein. FIG. 6C illustrates yet another variation of telecommunication network 600. In the embodiment illustrated in FIG. 6C, the first three messages, (FIG. 6C, message 1, 2, and 3) are essentially the same as the first three messages of FIG. 6A, and therefore their descriptions will not be repeated herein. However, in the embodiment illustrated in FIG. 6C, PRXM 108 performs the additional step of mapping the translated DN that was received from TFDB 110 (FIG. 6C, message 3) into a URI by issuing an ENUM query (FIG. 6C, message 4) to ENUMDB 112 and receiving a response (FIG. 6C, message 5) that includes the URI corresponding to the translated DN. In the embodiment illustrated in FIG. 6C, PRXM 108 issues a SIP MOVED message (FIG. 6C, message 6) that includes the URI instead of the translated DN that is returned in FIG. 6A.

Figure 6D:
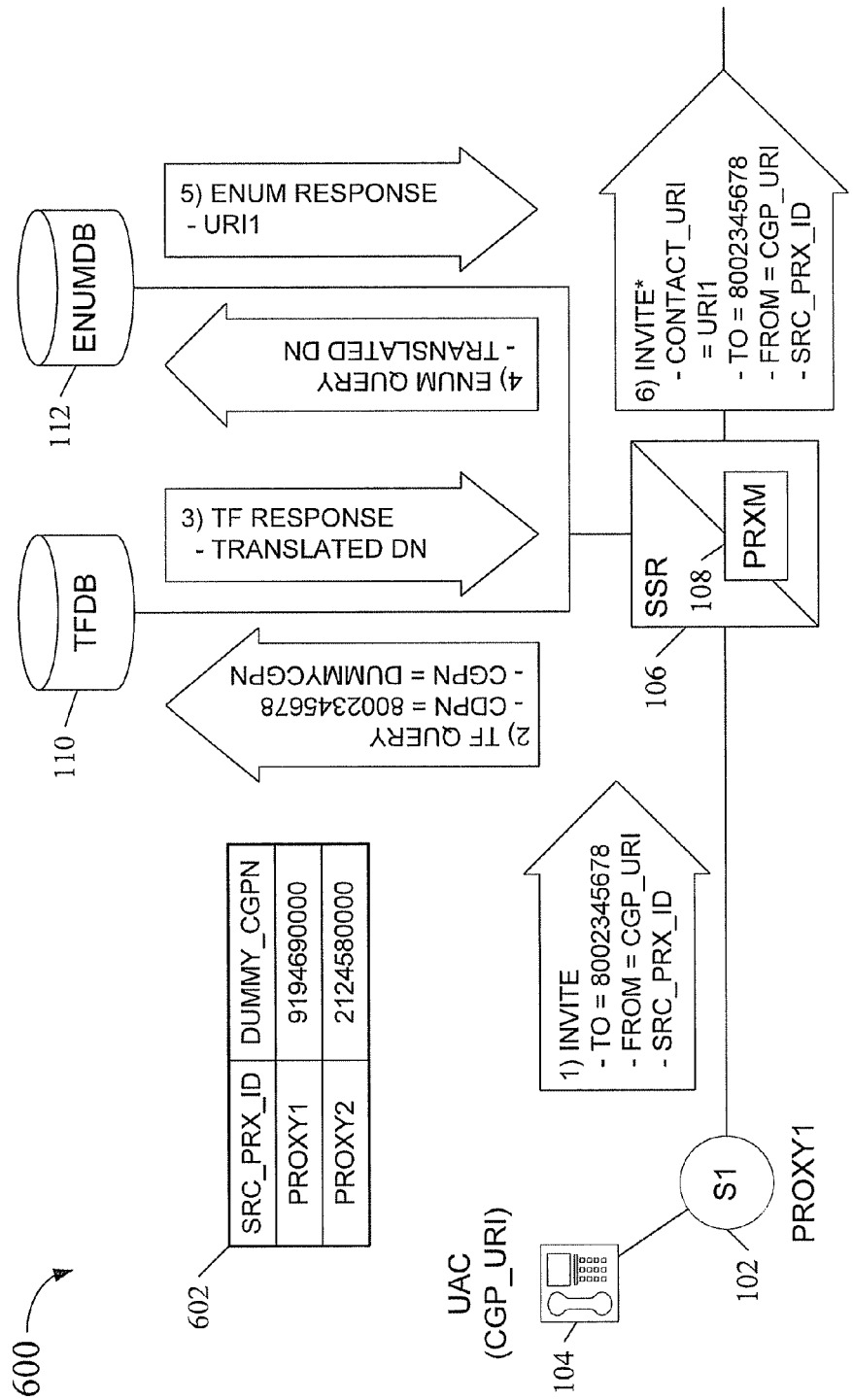
FIG. 6D is a block diagram illustrating signaling messages communicated within an exemplary system for providing location-sensitive called-party number translation according to another embodiment of the subject matter described herein.

FIG. 6D is a block diagram illustrating signaling messages communicated within an exemplary system for providing location-sensitive called-party number translation according to another embodiment of the subject matter described herein. FIG. 6D illustrates yet another variation of telecommunication network 600. In the embodiment illustrated in FIG. 6D, the first five messages, (FIG. 6D, message 1, 2, 3, 4, and 5) are essentially the same as the first five messages of FIG. 6C, and therefore their descriptions will not be repeated herein. However, in the embodiment illustrated in FIG. 6D, PRXM 108 sends a second signaling message (FIG. 6D, message 6) forward, using the translated DN supplied by TFDB 110 as the contact URI, instead of sending the SIP MOVED message back to S1 102, as was done in FIG. 6C.

Figure 7A:
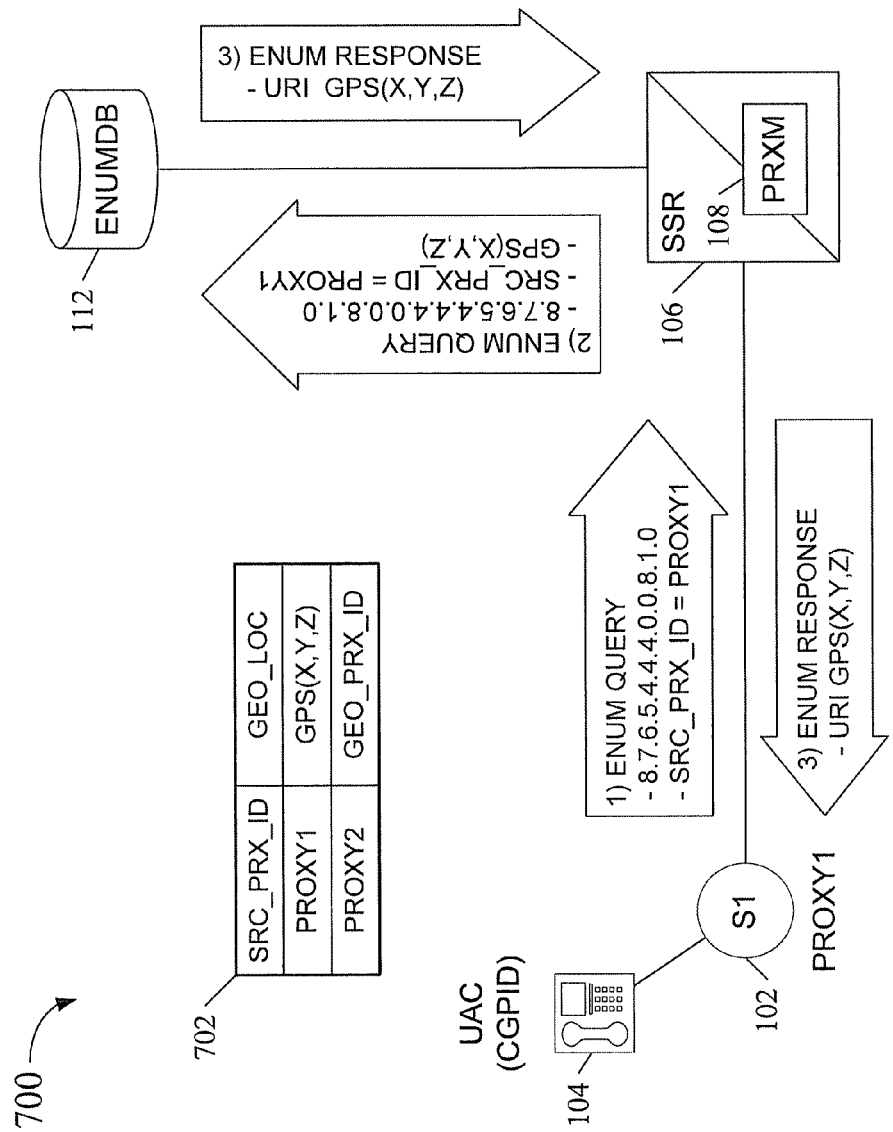
FIG. 7A is a block diagram illustrating signaling messages communicated within an exemplary system for providing location-sensitive called-party number translation according to another embodiment of the subject matter described herein.

FIG. 7A is a block diagram illustrating signaling messages communicated within an exemplary system for providing location-sensitive called-party number translation according to another embodiment of the subject matter described herein. FIG. 7A illustrates an embodiment of a location-sensitive ENUM service, in which the location of the calling party is considered while performing the ENUM lookup of the called party. In the embodiment illustrated in FIG. 7A, a telecommunications network 700 that supports the session initiation protocol (SIP) includes a SIP proxy server S1 102 that is identified by the source proxy ID "PROXY1". S1 102 may, on behalf of calling party subscriber 104, issue an ENUM query (FIG. 7A, message 1) to location-sensitive ENUM database ENUMDB 112, the query including the called party number, 800-444-5678, which in one E.164 number format is "8.7.6.5.4.4.4.0.0.8.1.0". In the embodiment illustrated in FIG. 7A, the ENUM query includes the source proxy ID of S1 102, "PROXY1". The ENUM query is received by signaling node 106, which may be a SIP server/router (SSR).

In the embodiment illustrated in FIG. 7A, PRXM 108 includes an intermediate database 702 which maps source proxy ID to proximity information associated with the calling party, which can then be used in an ENUM query to location sensitive ENUM database ENUMDB 112. Referring to intermediate database 702, the source proxy ID for S1 102, "PROXY1", is mapped to a set of GPS coordinates, (X,Y,Z), which PRXM 108 uses in an ENUM query (FIG. 7A, message 2) to ENUMDB 112. Location-sensitive ENUMDB 112 uses the calling party E.164 number and the proximity information GPS coordinates to return a URI (FIG. 7A, message 3) that is most proximate to the GPS coordinates (X,Y,Z) and thus most proximate to calling subscriber 104. In one embodiment, PRXM 108 may forward this ENUM response to the source of the original query (FIG. 7A, message 4.)

Figure 7B:
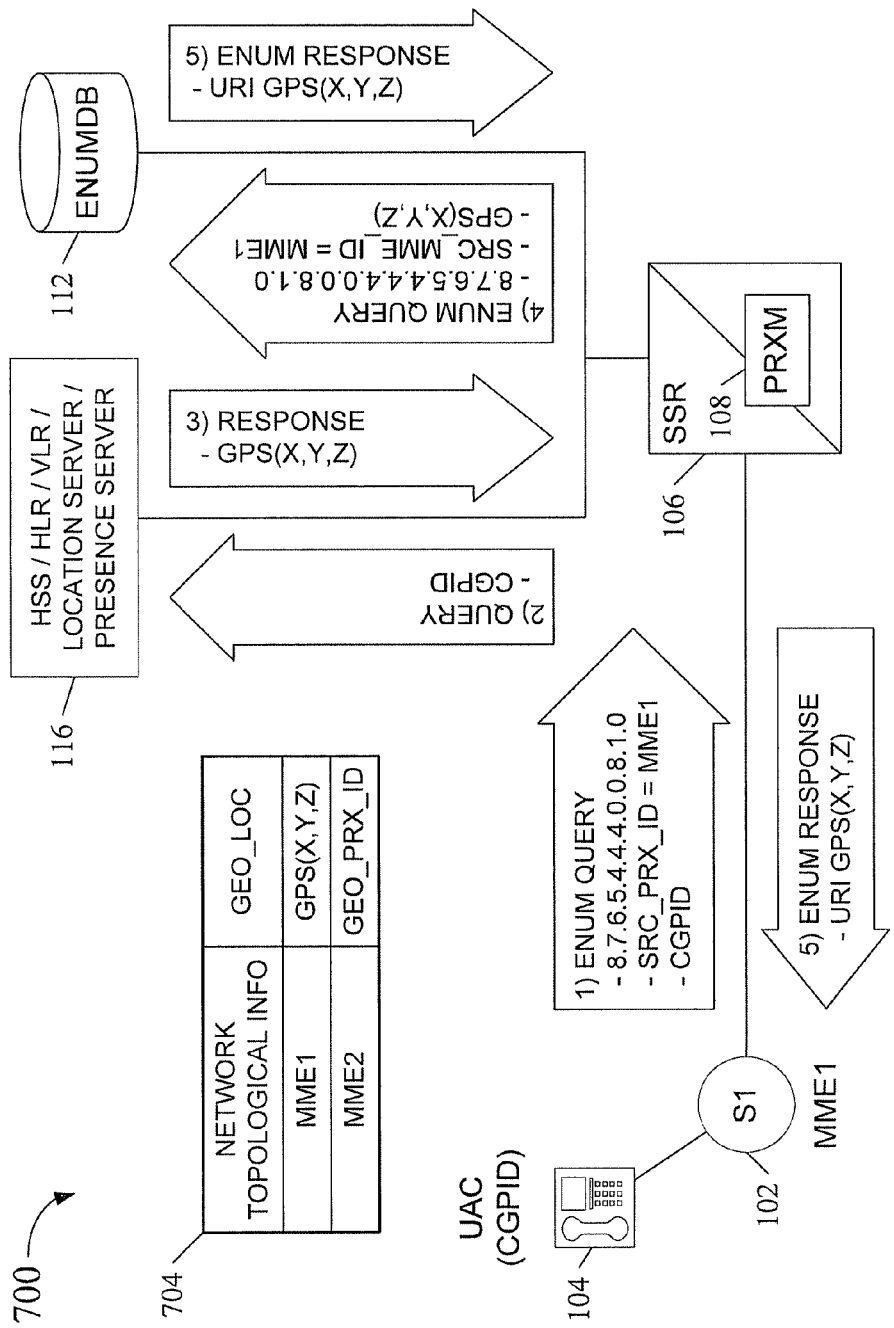
FIG. 7B is a block diagram illustrating signaling messages communicated within an exemplary system for providing location-sensitive called-party number translation according to another embodiment of the subject matter described herein.

FIG. 7B is a block diagram illustrating signaling messages communicated within an exemplary system for providing location-sensitive called-party number translation according to another embodiment of the subject matter described herein. In the embodiment illustrated in FIG. 7B, long term evolution (LTE) network 700 includes an LTE mobility management entity (MME)-compliant switch S1 102, which has a source proxy ID "MME1". S1 102 may, on behalf of calling party subscriber 104, issue an ENUM query (FIG. 7B, message 1), for the called party number, 800-444-5678, which in E.164 number format is "8.7.6.5.4.4.4.0.0.8.1.0". In the embodiment illustrated in FIG. 7A, the ENUM query includes the source proxy ID of S1 102, "MME1", and the calling party identifier, "CGPID". The ENUM query is received by signaling node 106, which may be a SIP server/router (SSR).

PRXM 108 may maintain provisioned data that maps a node identifier to geo-location coordinates or a geo-location proximity identifier that is representative of the geographic area or region served by the node. The mode identifier may be a SIP proxy, softswitch, P-CSCF, LTE MME, or MSC server identifier (e.g., network node identifier, network address, IP address, URI, routing number, etc.) or address. PRXM 108 may infer the source or originating proxy based on the signaling link or linkset, signaling association, signaling connection, signaling session, physical or logical port, etc., on which the ENUM query is received. In the embodiment illustrated in FIG. 7B, PRXM 108 extracts calling party/from party identification information generates a new query or modifies the original query, and forwards that query (FIG. 7B, message 2) to a network element/register/server 116, such as an HSS, an HLR, a visitor location register (VLR), a location server, a presence server, etc., which responds with location information for the calling party (FIG. 7B, message 3), such as GPS coordinates or other form of geographic location information.

In an alternative embodiment, the location information associated with the calling party returned by server 116 may be in the form of network topological information, such as a switch identity or address. Thus, in the embodiment illustrated in FIG. 7B, PRXM 108 includes an intermediate database 704 which maps network topological information, such as switch identifiers, to proximity information associated with the calling party, such as geographic location information.

PRXM 108 may then use the geographic location information associated with the calling party in an ENUM query (FIG. 7B, message 4) to location sensitive ENUM database ENUMDB 112. Location-sensitive ENUMDB 112 uses the calling party E.164 number and the proximity information GPS coordinates to return a URI (FIG. 7B, message 5) that is most proximate to the GPS coordinates (X,Y,Z) and thus most proximate to calling subscriber 104. In one embodiment, PRXM 108 may forward this ENUM response to the source of the original query (FIG. 7A, message 4.)

FIG. 8 illustrates some of the various allowed formats for E.164 numbers.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for providing location-sensitive called-party identifier translation in a telecommunications network, the method comprising:
   at a signaling system 7 (SS7) signal transfer point (STP) that includes at least one processor:
      receiving, from an originating switch, a first signaling message that includes a called party identifier and a mobile subscriber number within a calling party identifier field of the first signaling message;
      determining proximity information associated with the first signaling message by extracting a switch identifier of the originating switch from the first signaling message;
      modifying the first signaling message to create a modified message by removing the mobile subscriber number from the calling party identifier field of the first signaling message and inserting, in place of the mobile subscriber number, a value based on the switch identifier of the originating switch extracted from the calling party identifier field of the first signaling message;
      forwarding the modified message to a translation database system for performing a location-sensitive called party identifier translation based on the proximity information associated with the calling party, wherein performing a location-sensitive called party identifier translation based on the proximity information associated with the calling party includes selecting a called party identifier from a plurality of called party identifiers based on the proximity information associated with the calling party, wherein performing the location-sensitive called party identifier translation based on the proximity information associated with the calling party comprises:
  performing a toll-free query to a location-sensitive toll-free database for mapping a toll-free number to a directory number based on the proximity information associated with the calling party; and
  in response to obtaining the mapped directory number, performing an E.164 number translation (ENUM) query to a location-sensitive ENUM database for mapping E.164 telephone numbers to IP addresses; and
  sending the first signaling message or a second signaling message, the sent message including the translated called party identifier.

2. The method of claim 1 wherein the first signaling message is a signaling system 7 (SS7) message comprising one of:
  a call setup message;
  a transaction capabilities application part (TCAP) query; and
  a mobile application part (MAP) query.

3. The method of claim 1 wherein determining the proximity information associated with the calling party comprises issuing one of:
  a transaction capabilities application part (TCAP) query;
  a mobile application part (MAP) query;
  an intelligent network (IN) query;
  a wireless intelligent network (WIN) query;
  an advanced intelligent network (AIN) query; and
  a customized applications for mobile networks enhanced logic (CAMEL) query.

4. The method of claim 1 wherein sending the first signaling message comprises modifying the first signaling message to include the translated called party identifier and forwarding the first signaling message to a destination of the first signaling message.

5. The method of claim 1 wherein sending the second signaling message comprises sending the second signaling message to the originating switch.

6. The method of claim 1 wherein sending the second signaling message comprises sending the second signaling message to a destination of the first signaling message.

7. A system for providing location-sensitive called-party identifier translation in a telecommunications network, the system comprising:
  a signaling system 7 (SS7) signal transfer point (STP) for receiving, from an originating switch, a first signaling message that includes a called party identifier and a mobile subscriber number within a calling party identifier field of the first signaling message; and
  a proximity processing module operatively associated with the signal transfer point for determining proximity information associated with the first signaling message by extracting a switch identifier of the originating switch from the first signaling message, for modifying the first signaling message to create a modified message by removing the mobile subscriber number from the calling party identifier field of the first signaling message and inserting, in place of the mobile subscriber number, a value based on the switch identifier of the originating switch extracted from the calling party identifier field of the first signaling message, for forwarding the modified message to a translation database system for performing a location-sensitive called party identifier translation based on the proximity information associated with the calling party, and for sending the first signaling message or a second signaling message, the sent message including the translated called party identifier, wherein performing a location-sensitive called party identifier translation based on the proximity information associated with the calling party includes selecting a called party identifier from a plurality of called party identifiers based on the proximity information associated with the calling party, wherein performing the location-sensitive called party identifier translation based on the proximity information associated with the calling party comprises:
  performing a toll-free query to a location-sensitive toll-free database for mapping a toll-free number to a directory number based on the proximity information associated with the calling party; and
  in response to obtaining the mapped directory number, performing an E.164 number translation (ENUM) query to a location-sensitive ENUM database for mapping E.164 telephone numbers to IP addresses.

8. The system of claim 7 wherein the first signaling message is a signaling system 7 (SS7) message comprising one of:
  a call setup message;
  a transaction capabilities application part (TCAP) query; and
  a mobile application part (MAP) query.

9. The system of claim 7 wherein the proximity processing module determines the proximity information associated with the calling party by issuing one of:
  a transaction capabilities application part (TCAP) query;
  a mobile application part (MAP) query;
  an intelligent network (IN) query;
  a wireless intelligent network (WIN) query;
  an advanced intelligent network (AIN) query; and
  a customized applications for mobile networks enhanced logic (CAMEL) query.

10. The system of claim 7 wherein the proximity processing module sends the first signaling message by modifying the first signaling message to include the translated called party identifier and forwarding the first signaling message to a destination of the first signaling message.

11. The system of claim 7 wherein the proximity processing module sends the second signaling message by sending the second signaling message to the source of the first signaling message.

12. The system of claim 7 wherein the proximity processing module sends the second signaling message by sending the second signaling message to a destination of the first signaling message.

13. A non-transitory computer readable medium having stored thereon executable instructions that when executed by the processor of a computer control the computer to perform steps comprising:
  receiving, at a signaling system 7 (SS7) signal transfer point (STP), and from an originating switch, a first signaling message that includes a called party identifier and a calling party identifier within a calling party identifier field of the first signaling message;
  determining proximity information associated with the calling party first signaling message by determining a switch identifier of the originating switch;
  modifying the first signaling message to create a modified message by replacing the calling party identifier with a value based on the switch identifier of the originating switch in the calling party identifier field of the first signaling message;
  forwarding the modified message to a translation database system for performing a location-sensitive called party identifier translation based on the proximity information associated with the calling party, wherein performing a location-sensitive called party identifier translation based on the proximity information associated with the calling party includes selecting a called party identifier from a plurality of called party identifiers based on the proximity information associated with the calling party, wherein performing the location-sensitive called party identifier translation based on the proximity information associated with the calling party comprises:

performing a toll-free query to a location-sensitive toll-free database for mapping a toll-free number to a directory number based on the proximity information associated with the calling party; and in response to obtaining the mapped directory number, performing an E.164 number translation (ENUM) query to a location-sensitive ENUM database for mapping E.164 telephone numbers to IP addresses; and sending the first signaling message or a second signaling message, the sent message including the translated called party identifier.

14. The method of claim 1 wherein the called party identifier comprises a called party number.

15. The system of claim 7 wherein the called party identifier comprises a called party number.

\* \* \* \* \*